United States Patent
Németh et al.

(10) Patent No.: US 9,207,951 B2
(45) Date of Patent: Dec. 8, 2015

(54) GROUPING WITH FRAMES TO TRANSFORM DISPLAY ELEMENTS WITHIN A ZOOMING USER INTERFACE

(75) Inventors: Péter Németh, Budapest (HU); Bálint Bulcsú Gábor, Budapest (HU); Ádám Somlai-Fisher, Budapest (HU); David Udvardy, Budapest (HU); David Gauquelin, Budapest (HU); Laszlo Laufer, Budapest (HU); Ákos Tóth-Máté, Godollo (HU); Lior Paz, Budapest (HU); Zsuzsa Weiner, Budapest (HU); Péter Vajda, Budapest (HU); Peter Halacsy, San Francisco, CA (US)

(73) Assignee: Prezi, Inc., San Francisco, CA (US)

( * ) Notice: Subject to any disclaimer, the term of this patent is extended or adjusted under 35 U.S.C. 154(b) by 329 days.

(21) Appl. No.: 13/298,523

(22) Filed: Nov. 17, 2011

(65) Prior Publication Data

US 2013/0132895 A1    May 23, 2013

(51) Int. Cl.
*G06F 3/00*    (2006.01)
*G06F 9/44*    (2006.01)
*G06F 3/01*    (2006.01)

(52) U.S. Cl.
CPC .... *G06F 9/4443* (2013.01); *G06F 2203/04806* (2013.01)

(58) Field of Classification Search
USPC ........... 715/799, 781, 823, 723, 800; 345/173
See application file for complete search history.

(56) References Cited

U.S. PATENT DOCUMENTS

| | | | |
|---|---|---|---|
| 6,304,271 B1 * | 10/2001 | Nehme | 345/620 |
| 6,377,285 B1 * | 4/2002 | Doan et al. | 715/764 |
| 7,707,503 B2 | 4/2010 | Good et al. | |
| 8,448,083 B1 * | 5/2013 | Migos et al. | 715/781 |
| 8,957,920 B2 * | 2/2015 | Giambalvo et al. | 345/660 |
| 2003/0090504 A1 * | 5/2003 | Brook et al. | 345/716 |
| 2004/0239686 A1 * | 12/2004 | Koyama et al. | 345/620 |
| 2005/0198591 A1 * | 9/2005 | Jarrett et al. | 715/863 |
| 2005/0243373 A1 * | 11/2005 | Silverbrook et al. | 358/1.18 |

(Continued)

OTHER PUBLICATIONS

"The Zooming User Interface", [online]. [archived Dec. 12, 2010]. Retrieved from the Internet: <URL: http://web.archive.org/web/20101212180049/http://advogato.org/ article/788.html>, (posted Aug. 16, 2004), 11 pgs.

(Continued)

*Primary Examiner* — Amy Ng
*Assistant Examiner* — Toan Vu
(74) *Attorney, Agent, or Firm* — Schwegman Lundberg & Woessner, P.A.

(57) ABSTRACT

A method is provided to edit a display screen of a zooming user interface system; the method includes receiving a user request to transform a set of display elements that are displayed on a display screen encompassed by a frame; in response to the user request an information structured is produced in a non-transitory storage device that indicates each display element of the set of display elements that is displayed on the display screen encompassed by the frame; each display element indicated by the information structure is transformed according to the user request.

77 Claims, 17 Drawing Sheets

(56) References Cited

U.S. PATENT DOCUMENTS

| | | | |
|---|---|---|---|
| 2005/0257163 A1* | 11/2005 | Conrad et al. | 715/769 |
| 2006/0193538 A1* | 8/2006 | Vronay et al. | 382/305 |
| 2007/0182743 A1* | 8/2007 | Aguera y Arcas | 345/440 |
| 2007/0192739 A1* | 8/2007 | Hunleth et al. | 715/823 |
| 2009/0067753 A1* | 3/2009 | Hanechak | 382/298 |
| 2009/0085932 A1* | 4/2009 | Kawamoto et al. | 345/629 |
| 2009/0109243 A1* | 4/2009 | Kraft et al. | 345/660 |
| 2009/0147297 A1* | 6/2009 | Stevenson | 358/1.15 |
| 2009/0265632 A1 | 10/2009 | Russ et al. | |
| 2010/0146393 A1* | 6/2010 | Land et al. | 715/723 |
| 2010/0199214 A1* | 8/2010 | Mikawa | 715/800 |
| 2010/0232704 A1* | 9/2010 | Thorn | 382/195 |
| 2010/0271288 A1* | 10/2010 | Srinivasan et al. | 345/2.2 |
| 2011/0316884 A1* | 12/2011 | Giambalvo et al. | 345/660 |
| 2012/0017147 A1* | 1/2012 | Mark | 715/702 |
| 2012/0110438 A1* | 5/2012 | Peraza et al. | 715/243 |
| 2012/0110519 A1* | 5/2012 | Werner et al. | 715/863 |
| 2014/0191993 A1* | 7/2014 | YU et al. | 345/173 |
| 2014/0351727 A1* | 11/2014 | Danton et al. | 715/765 |

OTHER PUBLICATIONS

Deline, R., et al., "Code Canvas: Zooming towards Better Environments", *In: Proceedings of the International Conference on Software Engineering*, [online]. Retrieved from the Internet: <URL: http://research.microsoft.com/pubs/121031/CodeCanvas-ICSE10-NIER.pdf>, (2007), 1-4.

Perron, B. E., et al., "A Review of a Presentation Technology: Perzi", *Research on Social Work Practice*, 21(3), [online]. Retrieved from the Internet: <URL: http://deepblue.lib.umich.edu/bitstream/2027.42/78306/1/Prezi.pdf., (May 11, 2011), 1-2.

Sharp, R., "An introduction to the Canvas 2D API", [online]. [retrieved Aug. 6, 2010]. Retrieved from the Internet: <URL: http://web.archive.org/web/20100806030137/http://html5doctor.com/an-introduction-to-the-canvas-2d-api/>, (Aug. 3, 2010), 5 pgs.

Sucan, M., "SVG or Canvas? Choosing between the two", [online], Retrieved from the Internet: <URL: http://dev.opera.com/articles/tags/open%20web/>, (Feb. 2, 2010), 7 pgs.

\* cited by examiner

GROUPING WITH FRAMES TO TRANSFORM DISPLAY ELEMENTS WITHIN A ZOOMING USER INTERFACE

BACKGROUND

A zooming user interface (ZUI) is a type of graphical user interface (GUI) in which the scale of a viewed area is changed in order to view more detail or less, and to browse through and among different visual display elements such as images, shapes, documents, or videos. Display elements may be added to a workspace referred to as a 'canvas' to create a zoomable presentation in which details and subtopics can be presented through zooming in and out to reveal more or less detail. The canvas is larger than a viewing window generated on a device display screen, and a user can scroll a viewing window to view different display elements. The ZUI differs from a normal canvas in that the user may zoom in or out onto a particular display element. Display elements can be inserted anywhere among the presentation content, in addition to grouping display elements within frames. Users can pan across the canvas in two dimensions and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. Thus, ZUIs use zooming as the primary metaphor for browsing through multivariate or hyperlinked information. Display elements present inside a zoomed region can in turn be zoomed themselves to reveal additional detail, allowing for recursive nesting and an arbitrary level of zoom.

FIG. 1A-1C are an illustrative drawings showing display elements viewed through a viewing window disposed on a canvas at three different zoom levels. FIG. 1A shows a viewing window 2 through which portions of display elements 4 and 6 are visible but in which display elements 8-14 are not visible. The four arrows in FIG. 1A indicate the ability to move the viewing window so as to pan across the canvas. FIG. 1B shows a zoomed out view of the same canvas in which display elements 4-14 are visible through the viewing window 2. FIG. 1C shows a zoomed in view of display element 6 on the same canvas through the viewing window 2.

SUMMARY

A method and article of manufacture are provided to edit a display screen of a zooming user interface system. The method includes receiving a user request to transform a set of display elements that are displayed on a display screen encompassed by a frame. In response to the user request an information structured is produced in a non-transitory storage device that indicates each display element of the set of display elements that is displayed on the display screen encompassed by the frame. Each display element indicated by the information structure is transformed according to the user request.

DESCRIPTION OF EMBODIMENTS

Figure 1A:
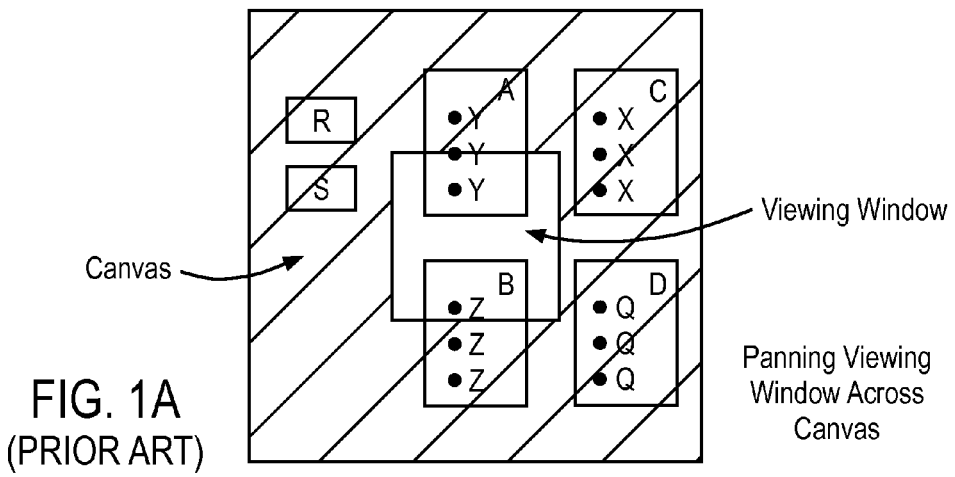
FIGS. 1A-1C are an illustrative drawings showing display elements viewed through a viewing window disposed on a canvas at three different zoom levels.
Figure 1B:
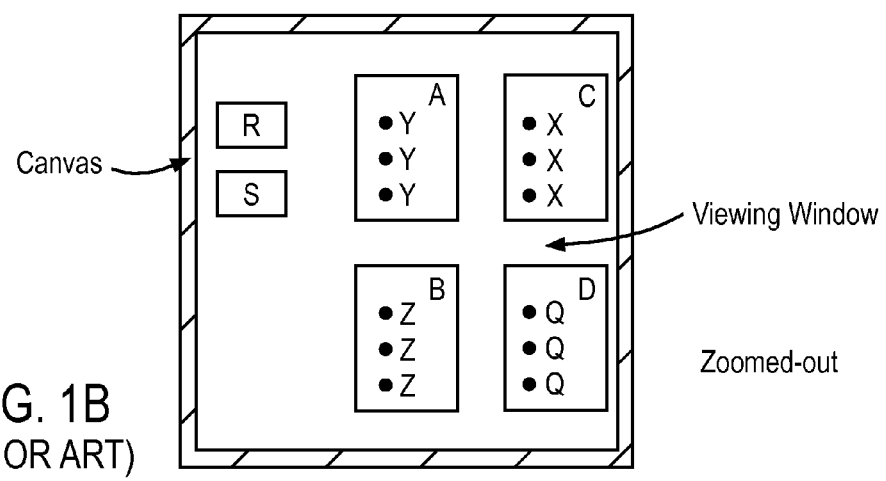
Figure 1C:
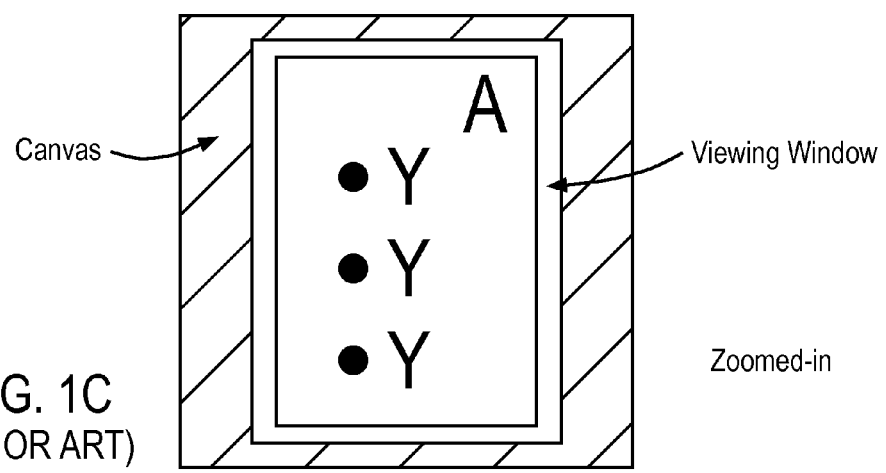

The following description is presented to enable any person skilled in the art to configure a computer system and related method and article of manufacture to transform display elements that are grouped within a frame in a zooming user interface environment. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Identical reference numerals may be used to represent different views of the same or substantially the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Overview of Editing a Zooming User Interface

FIGS. 2A-2F are illustrative drawings representing example user interaction with a zooming user interface during an editing process to create a presentation in accordance with some embodiments. The editing process is explained in the context of a particular zooming user interface (ZUI) environment, which is illustrative and not intended to be limiting. For example, the ZUI employs a particular editing control element that includes multiple control regions and that is shown on a display screen superimposed over a display item that is to be transformed in some manner. It will be appreciated, however, that a ZUI with additional or alternative control mechanisms such as pull-down menus or pop-up menus can be used, for example.

Figure 3:
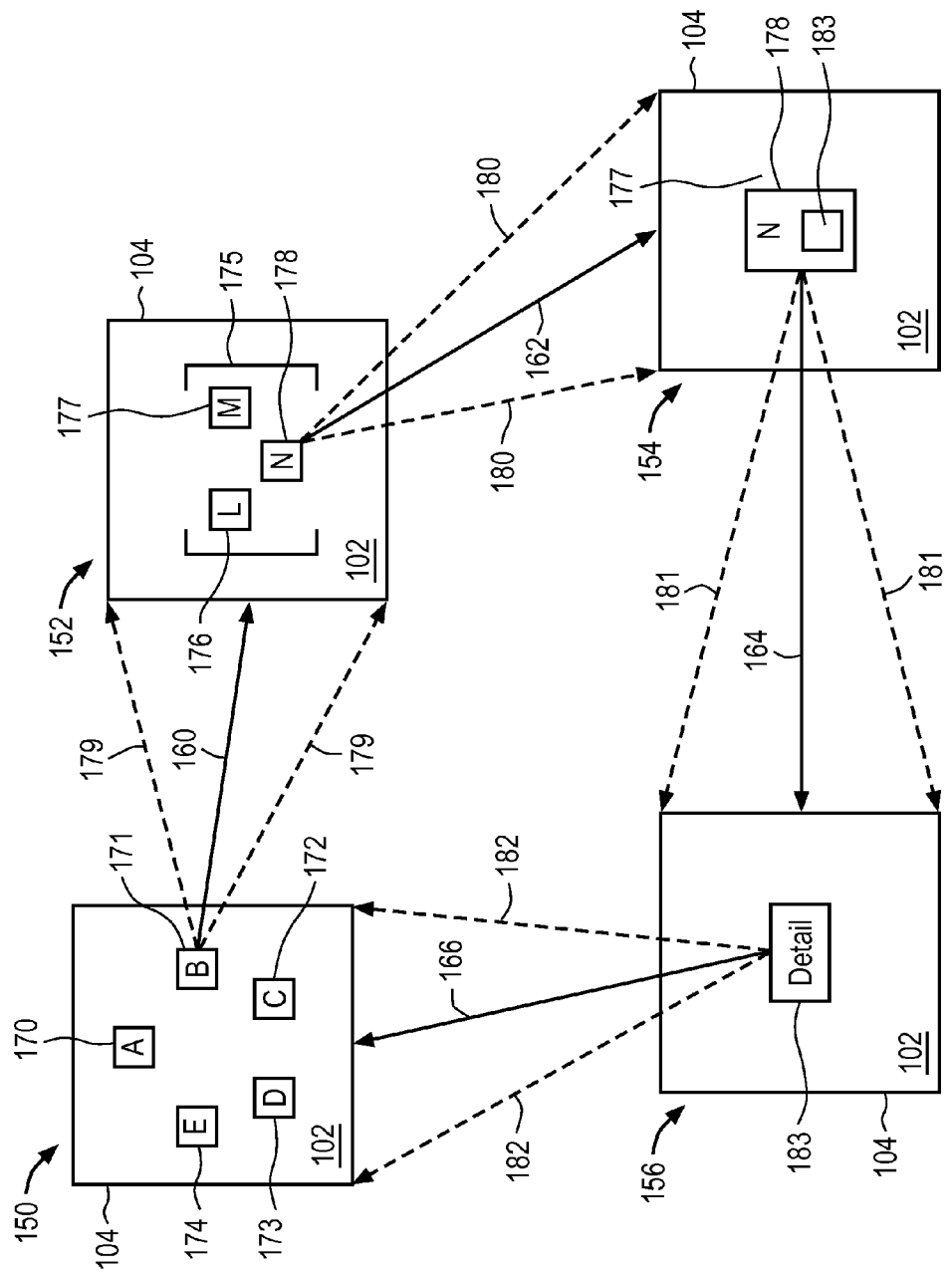
FIG. 3 is an illustrative drawing of an example presentation that includes a sequence of screen images showing display elements produced on the display screen in accordance with some embodiments.

FIG. 3 shows an illustrative sequence of images produced on a display screen 104 during an example presentation in accordance with some embodiments. A presentation created using the ZUI environment is encoded in computer readable code stored in a computer readable storage device and can be used to configure a computer system to show the presentation on a display screen. The editing process to create a presentation involves adding a plurality of display elements to a canvas and defining attributes for individual display elements or groups of display elements such as their size, orientation, location, zoom level and order of order of presentation. As used herein, the term 'display element' refers to a computer generated image that is displayed on a portion of a canvas visible on a display screen in the course of a zooming presentation and that, therefore, constitutes a part of the presentation. A display element may include text, image, graphics, shapes, video, animation, hypertext link, other (nested) display elements or other visual components, for example. As used herein the term 'canvas' refers to an abstract space with its own coordinate system on which visual content is presented. The coordinate system of a canvas comprises two (2) dimensions, and display elements are displayed at (x,y) coordinate locations designated by a user during an editing mode of operation. Sometimes the coordinate system is referred having 2.5 dimensions due to zooming capability. At any given time, only a portion of the canvas is visible. A user may view portions of a canvas through a window. The use of a canvas and a viewing window allows for non-linear presentations, the option to present richer detail of content, and to give a better overview and understanding of complex visual messages and relations. While viewing the canvas through a viewing window, users can pan across the canvas in two dimensions and zoom into objects of interest. For example, as a user zooms into a text object it may be represented as a small dot, then a thumbnail of a page of text, then a full-sized page and finally a magnified view of the page.

Figure 2A:
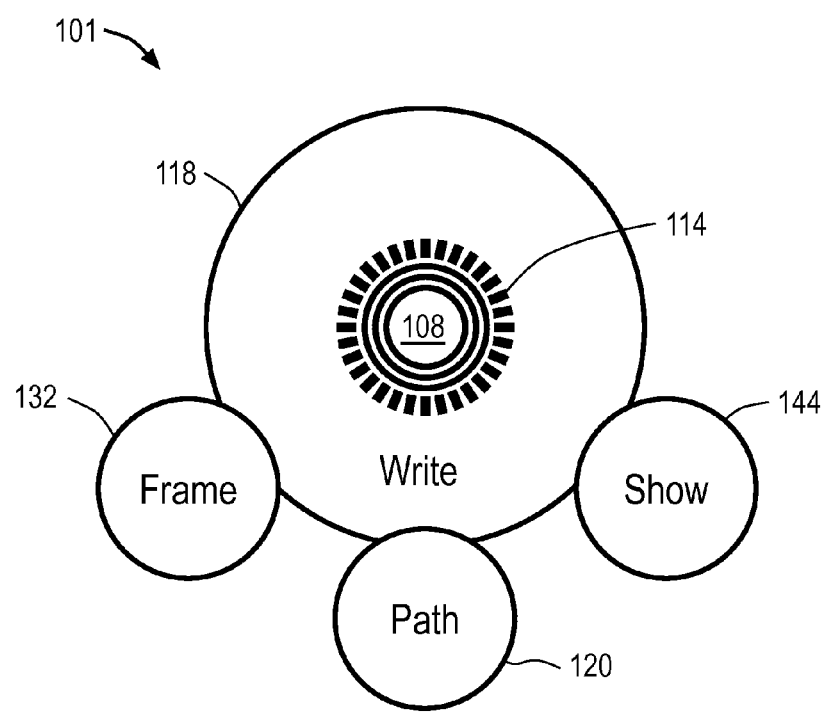
FIG. 2A is an illustrative drawing of a multi-function editing control element displayed on a display screen in accordance with some embodiments.

Referring now to FIG. 2A there is shown an illustrative drawing of a multi-function editing control element 101 displayed on a display screen in accordance with some embodiments. The control element 101 includes multiple control regions that a user can use to select, actuate invoke different transformations of a display element upon which it is superimposed. In operation, the editing control element 101 is displayed superimposed over the display element with which it is currently associated. The control element 101 can be made to disappear from view so as not to be a distraction, once a transformation of a display element is completed. In some embodiments, the editing control element is called a 'zebra'. The editing control element will be described with reference to those transformations, which are explained with reference to FIGS. 2B-2F.

Figure 2B:
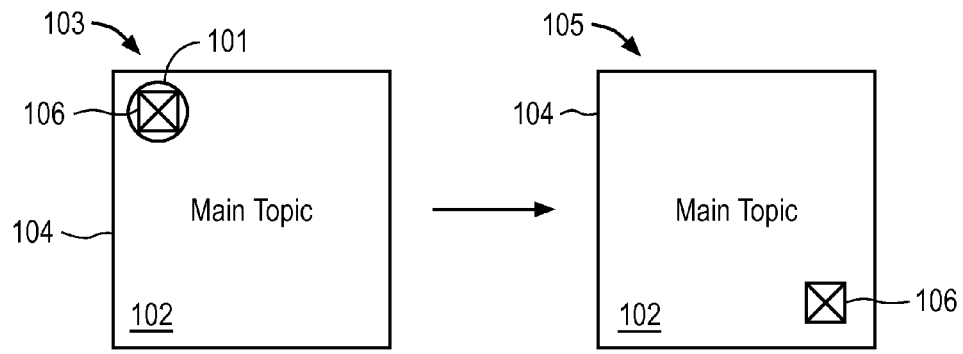
FIG. 2B is an illustrative drawing representing two example screen images produced on a display screen showing an example transformation of location of a display element on a canvas in accordance with some embodiments.

FIG. 2B is an illustrative drawing representing two example screen images 103, 105 produced on a display screen 104 showing an example transformation of location of a display element on a canvas 102 in accordance with some embodiments. Referring to screen image 103, a user can start to create a presentation by using a point and click device to select an open space in a canvas 102 shown within a display screen 104 to add text, which is one form of display element. In this example, another display element 106 also is shown in the two screen images 103, 105. For example, for a text display element a user can click on the text to associate the multi-function editing control element 101 with the text or the user can click on the other display element 106 to associate the multi-function editing control element 101 with that other display element 106. In some embodiments, the editing control element has different modes of operation for different kinds of display elements. For a text display element, such as "main topic", a user can click on or otherwise actuate the control element 101 to invoke an edit box (not shown) to permit editing of the text on which it is superimposed. A user can click and hold the first region 108 of the control element 101 to transform the location on the canvas 102 of an associated display element. For example, a user can use the control element 101 to drag (i.e. move) the associated display element 106 from a first location on the canvas 102 shown in the screen image 103 on the left to a second location shown in the screen image 105 on the right. Note that the location on the canvas 102 of the other screen text display element, 'main topic', is unchanged in the two screen images 103, 105.

Figure 2C:
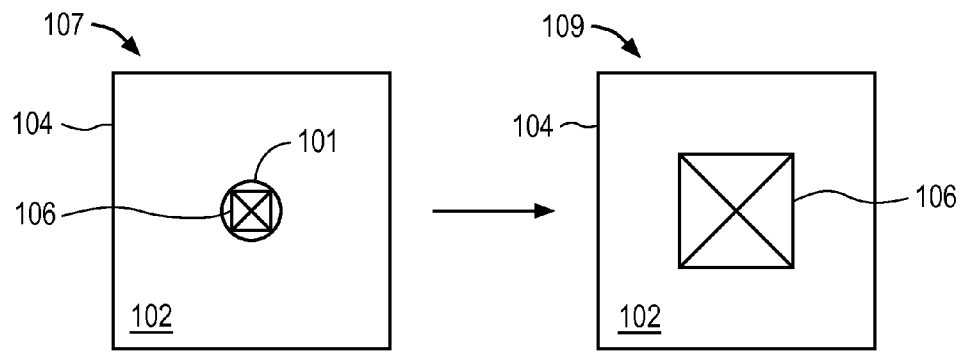
FIG. 2C is an illustrative drawing representing two example screen images produced on a display screen showing an example transformation of size of a display element on a canvas in accordance with some embodiments.

FIG. 2C is an illustrative drawing representing two example screen images 107, 109 produced on a display screen 104 showing an example transformation of size of a display element on a canvas 102 in accordance with some embodiments. In some embodiments, the size of a display element 106 on which the control element 101 is superimposed may be increased or decreased by dragging a second control region 114 associated on an inner ring within the control element 101 inward to shrink or outward to enlarge, respectively. For example, screen image 107 shows the display element 106 sized smaller on the canvas 102, and screen image 109 shows the same display element 106 sized smaller on the canvas 102. Note that the text display element is not shown in order to simplify the drawings.

It will be appreciated that in a zooming presentation, size can be used to indicate hierarchy or relative importance within a presentation. Display elements representing important topics can be shown with larger size. Display elements representing less important topics or sub-topics can be shown with smaller size. A presentation often involves focusing first on a large size display element that represents a major idea and then zooming in on a smaller size display element that represents the details. Thus, during editing to create a presentation, a display element that represents details of a topic can be made smaller in size than a display element that represents a more general idea. During the presentation, a path sequence may visit a display element representing the more important idea before visiting the display element representing the detail. Moreover, the presentation may be set up to initially show the detail display element in a smaller size relative to the major idea display element and to then zoom in on the detail display element causing it to become enlarged on a portion of a canvas shown within a display screen, for example.

Figure 2D:
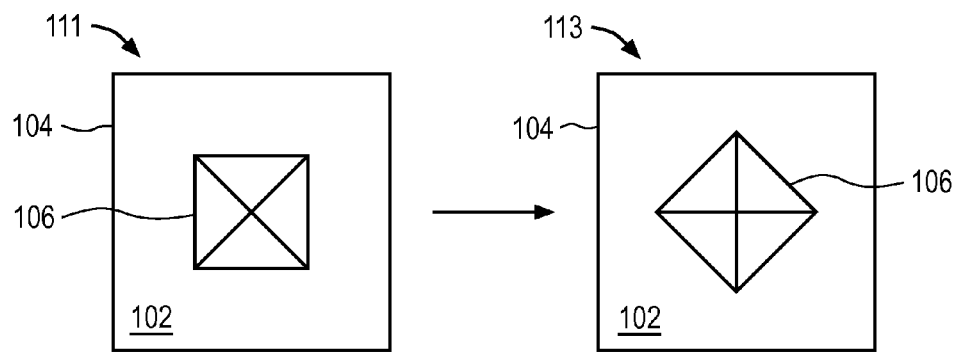
FIG. 2D is an illustrative drawing representing two example screen images produced on a display screen showing an example transformation of orientation of a display element on a canvas in accordance with some embodiments.

FIG. 2D is an illustrative drawing representing two example screen images 111, 113 produced on a display screen 104 showing an example transformation of orientation of a display element on a canvas 102 in accordance with some embodiments. For example, in some embodiments, the rotational orientation of a display element 106 currently associated with a control element is superimposed can be changed by using a pointing device to rotate a third region 118 of the control element 101 to cause a corresponding rotation of an associated display element 106. For example, screen image 111 shows the display element 106 before rotation on the canvas 102, and screen image 113 shows the same display element 106 after a slight rotation on the canvas 102.

Figure 2E:
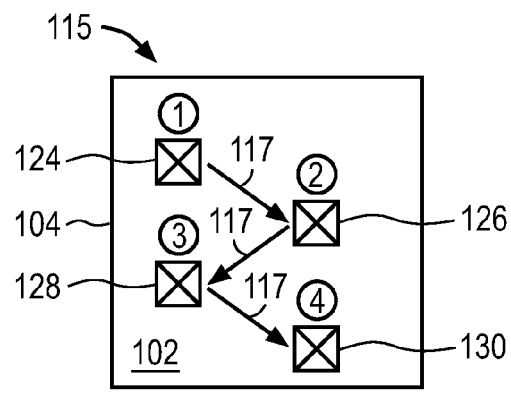
FIG. 2E is an illustrative drawing an example screen image produced on a display screen displaying multiple display elements on a canvas with path segments indicating a presentation path between them in accordance with some embodiments.

FIG. 2E is an illustrative drawing an example screen image 115 produced on a display screen 104 displaying multiple display elements 124-130 on a canvas 102 with path segments 117 indicating a presentation path between them in accordance with some embodiments. A user can select a region 120 of the control element 101 to create a path 122 between the display elements 124-130 on the canvas 102 to create a presentation story line. A path, comprising multiple path segments, allows a user to set the order in which the display elements appear during the presentation. For example, in some embodiments, after selecting the region 120, a user then selects display elements in the order in which they are to be presented to indicate a path sequence. In some embodiments, numeric indicators are displayed on the canvas to show the order in which display elements are shown during the presentation. In this example, the numbers 1 through 4 are shown to indicated that during a presentation, display element 124 is displayed first, followed by display element 126, followed by display element 128, followed by display element 128. Path segments are displayed during editing but not during actual presentation. It will be appreciated that not all display elements need be displayed simultaneously on the display screen 104 in order to define path segments; that is, a user may need to pan across the canvas to bring different display elements into view to order them into sequential positions within an overall path. Designating a path sequence will be readily understood by persons skilled in the art, and details of the path selection process are not described herein since they form no part of the present invention. During a presentation, display elements may be displayed automatically in the path sequence.

Figure 2F:
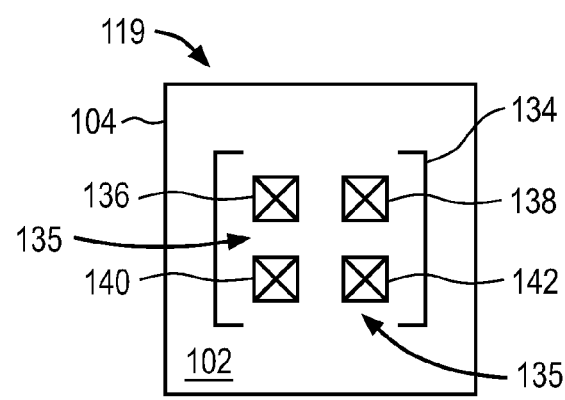
FIG. 2F is an illustrative drawing an example screen image produced on a display screen displaying a frame used to group display elements that are to appear together during a presentation.

FIG. 2F is an illustrative drawing an example screen image 119 produced on a display screen 104 displaying a frame 134 used to group a set of display elements 136-142 that are to appear together during a presentation. During editing to create a presentation, frame acts as visual a structure displayed on a screen display 104 to indicate a grouping of display elements. The visual image of a frame visually demarcates a framed region. In some embodiments, a frame is displayed as a visual boundary about some framed region, for example. In other embodiments, a frame is displayed by coloring or shading a framed region differently from regions outside of the frame. In other words, a boundary about a framed region that is defined by a frame may be displayed by a differential representation (e.g., different color or shading) of the framed region, for example. In some embodiments, a frame visibly demarcates a region 135 of canvas 102, and display elements disposed within that demarcated 'framed' region 135 of the canvas 102 are designated as part of a group that may be edited as a group during editing and that may be zoomed and focused upon as a group during presentation. More particularly, information encoded in non-transitory storage device indicates contour, dimensions and location of a framed region 135 of the canvas. The visual frame 134 that visually indicates a border about the framed region 135 is displayed on the display screen 104. Information encoded in non-transitory storage device indicates location of each of the display elements of the set of display elements 136-142, and the set of display elements 136-142 are displayed on the display screen within the framed region 135 encompassed by the frame 134. In some embodiments, the frame 134 at least partially surrounds the framed region 135. Alternatively, a frame may provide indicia of such as a visual tag (not shown) that indicates the display elements encompassed by the frame. A user may choose to group display elements together within a frame 134 by topic, for example. In accordance with some embodiments, a user can use the editing control element 101 to transform size, location and orientation of the frame 134 and the set of display elements 136-142 that it encompasses, for example. During an editing mode, the frame 134 acts as a display element that may be added in a path sequence so that the presentation can be made to pause and to zoom/focus on group of display elements enclosed together within the frame. During a presentation mode, the group of display elements 136-142 within a frame 134 are displayed but typically the frame itself is not displayed. Although the frame itself may be displayed during presentation mode also.

Presentation Example

Referring back to FIG. 2A, a user can select a region 144 of the control element 101 to initiate the showing of a presentation. The presentation may involve alternately panning across the canvas and zooming in to and zooming out from different display objects and frames. In some embodiments, zooming involves zooming the entire canvas, not just an individual item on the canvas. The act of zooming during a presentation can be used to signal to the audience a transition between topics. In other words, zooming can be used to shift audience focus from one topic of interest represented by one display element or frame (containing a group of elements) to a different topic of interest represented by a different display element or frame, for example. When a presentation is viewed, each display elements (including frames) in a path is visited in the order specified by the path sequence. In some embodiments, a default autoplay time is 4 seconds per stop on the path, and can be extended to 10 or 20 seconds. In some embodiments, a user can interrupt the automatic presentation flow to select (e.g., 'click') and zoom in on an object or to pan across the canvas, for example, which can allow for a more interactive discussion.

Referring again to FIG. 3, the example presentation includes a sequence of screen images 150-156 showing display elements produced on the display screen 104. More particularly, the example presentation follows a sequence of path segments 160-166 in which the first three path segments 160-164 involve transitions to successively more zoomed-in views of display elements on the canvas 102 and in which the fourth path segment 166 involves a transition to a more zoomed-out view of the canvas 102. It will be appreciated that path segments represent computer code data structures encoded in a storage device that indicate the order of transitions among views in the presentation shown on the display screen 104, but they are not visible in the actual presentation. The example presentation first generates screen image 150 in which display elements 170-174 are visible. As indicated by dashed lines 179, the presentation next presents a second screen image 152 that zooms in to focus on one of the display element 171, which in this example, is associated with a frame 175 (which may not be visible during the presentation) that groups together additional display elements 176-178. It will be appreciated that the frame 175 acts as a point of focus for zooming during the presentation. As indicated by dashed lines 180, the presentation next presents a third screen image 154 that zooms in to focus on display element 178. The zoomed in view of display element 178 includes detail region 183 that was too small to be visible in screen images 150 and 152. As indicated by dashed lines 181, the presentation next presents a fourth screen image 156 that zooms in to focus in to and to show more detail and/or increased size of the region 183 of display element 178. As indicated by dashed lines 182, the presentation next zooms out to focus again on the first view 150. Thus, the illustrative presentation moves from screen images 150 to 154 to zooms in to the canvas 102 to focus on progressively more details of selected display elements and then zooms back out again from the canvas from screen image 156 to screen image 150.

Displaying Transformations of Display Elements Grouped with Frames

Figure 4:
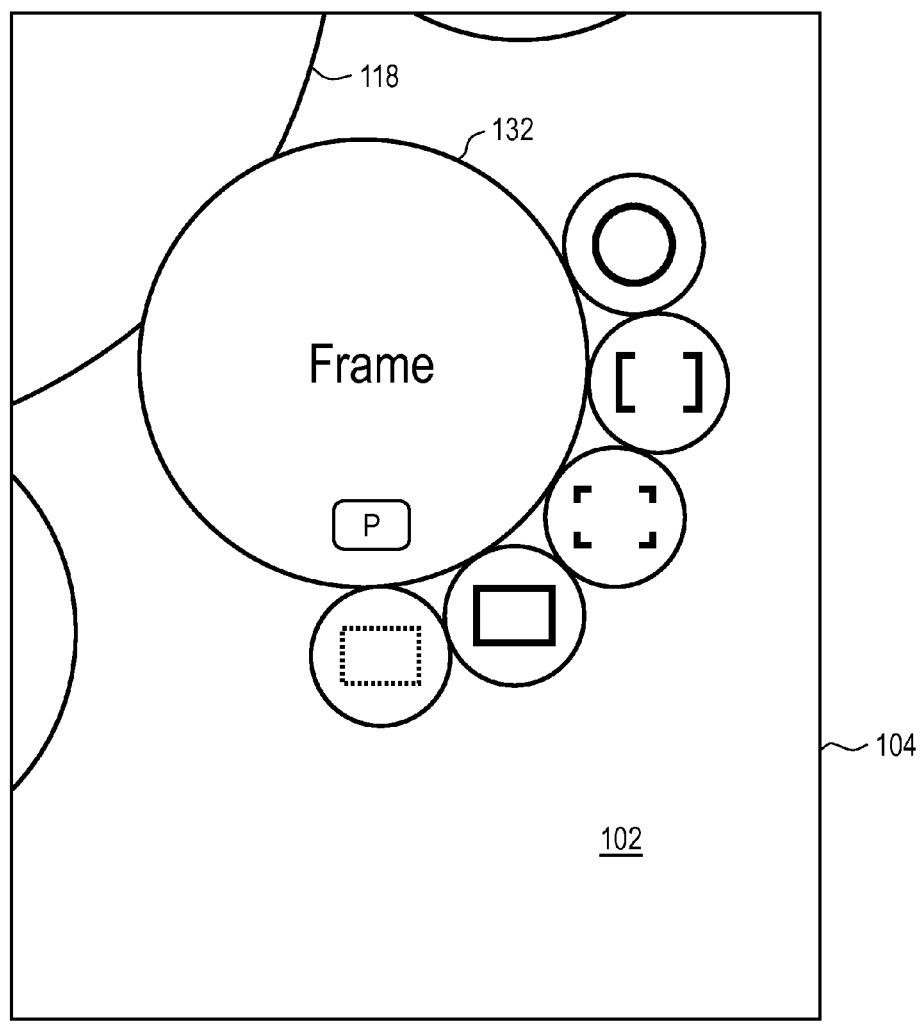
FIG. 4 is an illustrative drawing showing a selection of frame types that are displayed adjacent a frame select region of the control element shown on a display screen in accordance with some embodiments.
Figure 5:
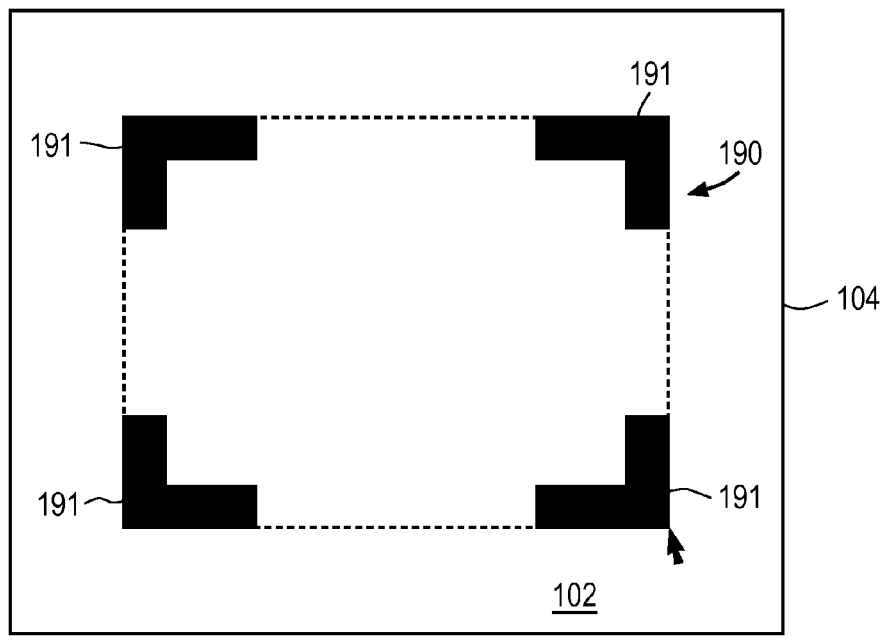
FIG. 5 shows a frame display having contours of one of the frame types displayed on a portion of a canvas shown on a display screen in accordance with some embodiments.
Figure 6:
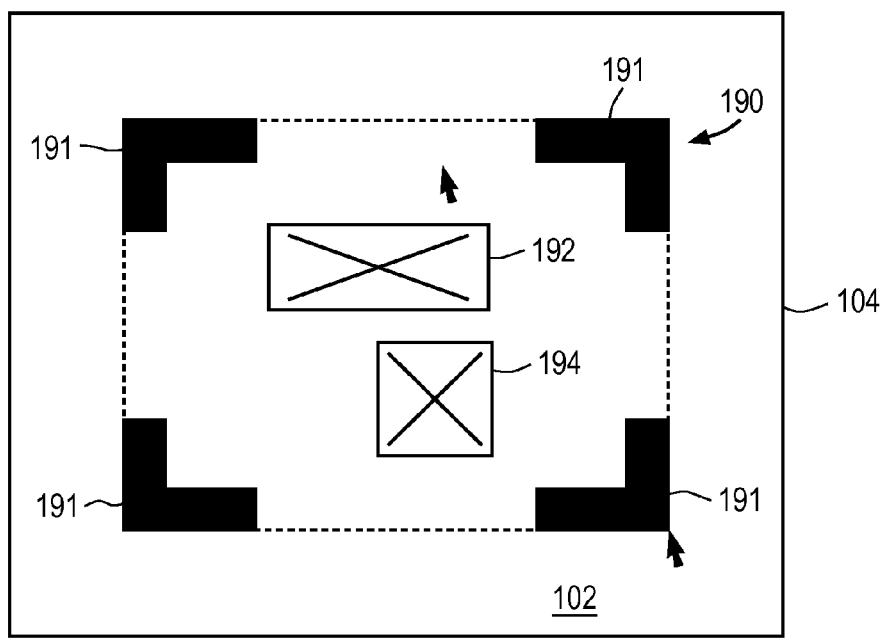
FIG. 6 shows first and second display elements disposed inside a region of the canvas encompassed by the frame of FIG. 5.

FIG. 4 is an illustrative drawing showing a selection of frame types that are displayed adjacent a frame select region 132 of the control element 101 shown on a display screen 104 in accordance with some embodiments. A user actuates (e.g. clicks on) the frame select region 132 to reveal the selection of frame types. FIG. 5 shows a frame display 190 having one of the frame types displayed on a portion of a canvas 102 shown on a display screen 104 in accordance with some embodiments. The frame 190 created in this example includes four angular brackets 191 arranged to define four corners of a rectangular region. FIG. 6 shows first and second display elements 192, 194 disposed inside a region of the canvas 102 encompassed by the frame 190. A user may insert or create these display elements 192, 194 on the canvas 102 within the frame display 190 according to the editing techniques described above with reference to FIGS. 2A-2F, for example.

Figure 7:
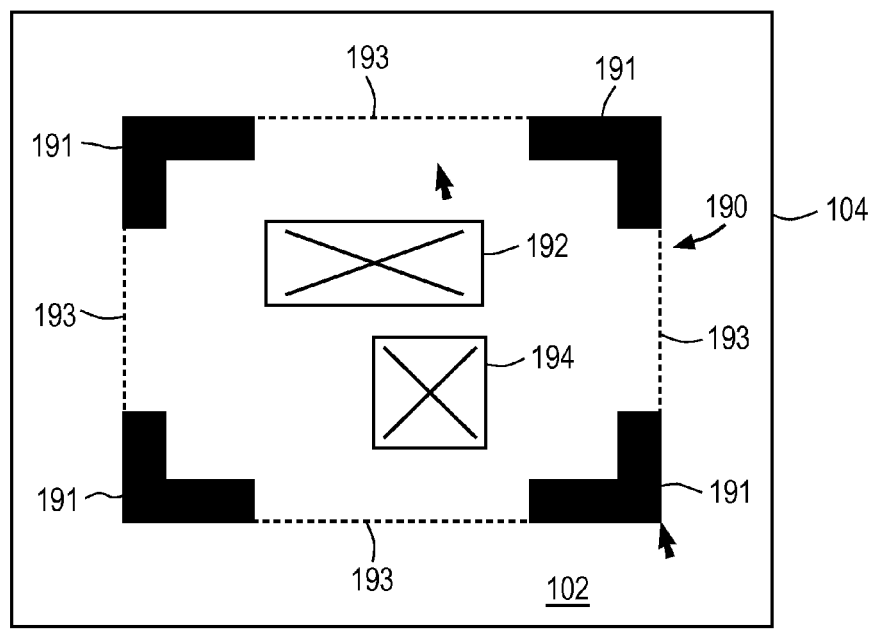
FIG. 7 is an illustrative drawing showing a change in visual appearance of the frame of FIG. 6 in response to a user selecting the frame in accordance with some embodiments.

FIG. 7 is an illustrative drawing showing a change in visual appearance of the frame of FIG. 6 in response to a user selecting the frame in accordance with some embodiments. In this example, dotted lines appear interconnecting the corner brackets 191 so as to further define visually the region enclosed by the frame 190, and the display elements 192, 194 within the frame 190 are highlighted (as indicated by shading). In some embodiments, a user selects the frame 190 by clicking on one of the visual frame itself, e.g. on one of the brackets 191, or by clicking on any portion of the canvas 102 encompassed by the frame 190 other than where the first and second display elements 191, 194 are disposed.

Figure 8:
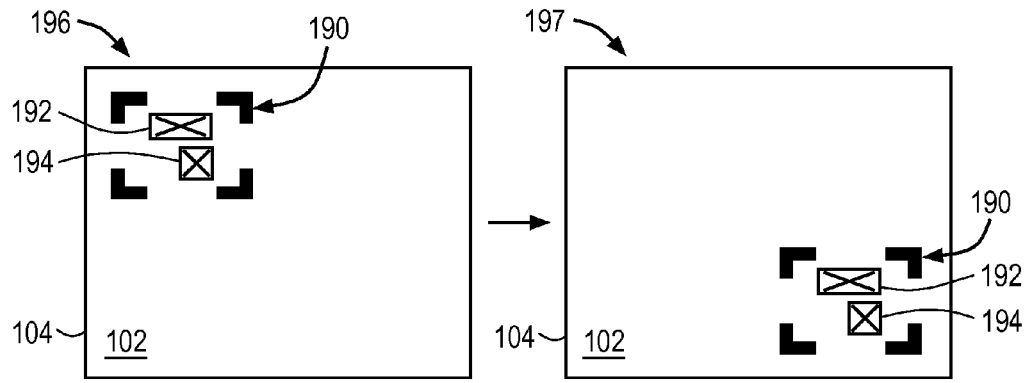
FIG. 8 is an illustrative drawing representing two example screen images produced on a display screen showing an example transformation of location on the canvas of the frame of FIG. 7 in accordance with some embodiments.
Figure 9:
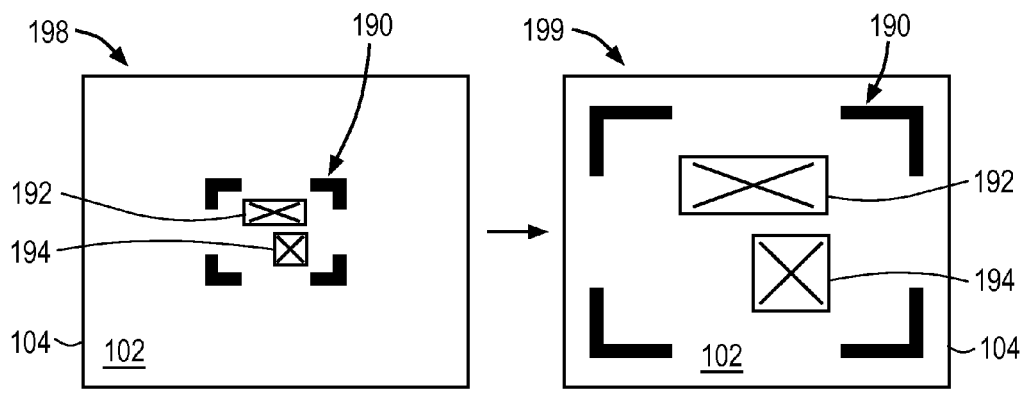
FIG. 9 is an illustrative drawing representing two example screen images produced on the display screen showing an example transformation of size on the canvas of the frame of FIG. 7 in accordance with some embodiments.
Figure 10:
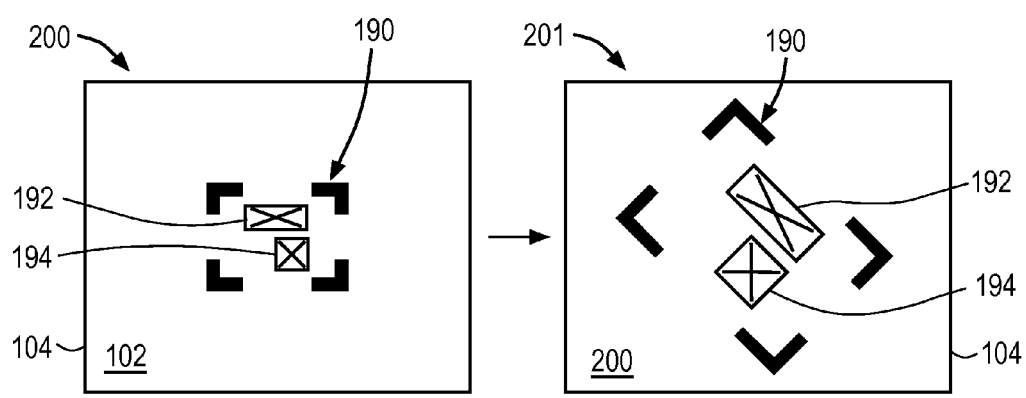
FIG. 10 is an illustrative drawing representing two example screen images produced on the display screen showing an example transformation of orientation on the canvas of the frame of FIG. 7 in accordance with some embodiments.

FIG. 8 is an illustrative drawing representing two example screen images 196, 197 produced on a display screen 104 showing an example transformation of location on the canvas 102 of the frame 190 of FIG. 7 in accordance with some embodiments. FIG. 9 is an illustrative drawing representing two example screen images 198, 199 produced on the display screen 104 showing an example transformation of size on the canvas 102 of the frame 190 of FIG. 7 in accordance with some embodiments. FIG. 9 illustrates a size transformation in which the size of the frame 190 and its constituents 192, 194 increases. FIG. 10 is an illustrative drawing representing two example screen images 200, 201 produced on the display screen 104 showing an example transformation of orientation on the canvas 102 of the frame 190 of FIG. 7 in accordance with some embodiments. In some embodiments, a user can control the transformations in location, size and orientation of the frame 190 using editing techniques above, for example.

The transformation that is applied to the frame 190 also is applied to each of the display elements encompassed by the frame. Referring to FIG. 8, the first and second display elements 192, 194 have their respective locations transformed by the same amount and in the same direction as the frame 190. Referring to FIG. 9, the first and second display elements 192, 194 have their respective sizes transformed by the same proportionate amount that the size of frame 190 changed. Referring to FIG. 10, the first and second display elements 192, 194 have their respective orientations transformed by the same angular amount that the orientation of frame 190 changed.

Figure 11:
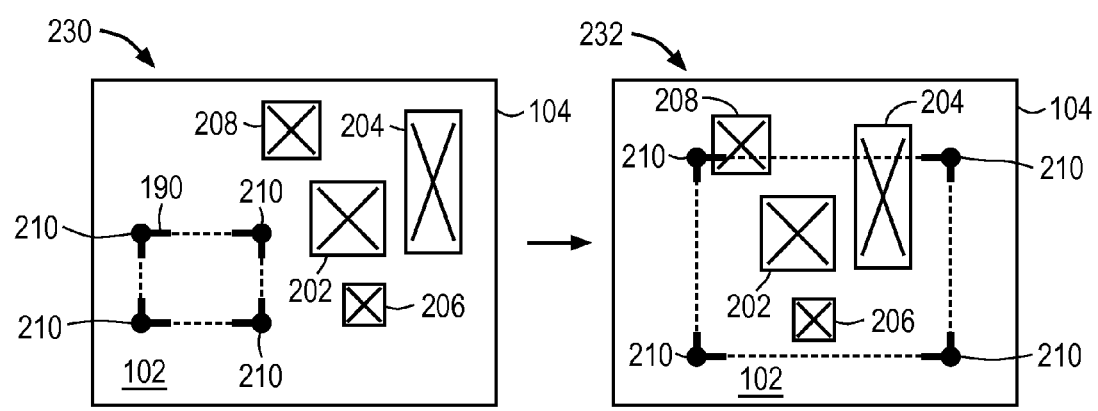
FIG. 11 is an illustrative drawing showing an example sequence of two display screen images during editing in which a frame is instantiated around display elements previously existing on a canvas in accordance with some embodiments.

FIG. 11 is an illustrative drawing showing an example sequence of two display screen images during editing in which a frame 190 is instantiated around display elements previously existing on a canvas 102 in accordance with some embodiments. A first screen display image 230 shows a display screen 104 that with the frame 190 prior to its transformation to encompass certain existing display elements. A second screen display image 232 shows the frame 190 after it has had both its location and its size transformed to encompass multiple display elements 202-206. Note that display element 208 remains disposed outside the frame 190. The location of the frame can be transformed using editing techniques described above, for example. The frame 190 includes control points 210 that can be used to resize the frame 190, e.g., to stretch or shrink the shape and the size of the region encompassed within the frame 190. The control points 210 form no part of the present invention and persons skilled in the art will readily understand how to make and use them. In some embodiments, any display element that has more than 50% of its area inside a frame is considered to be encompassed by the frame. Therefore, in the second screen image 232 in this example, display element 204 is encompassed frame 190, but display element 210 is not.

Figure 12:
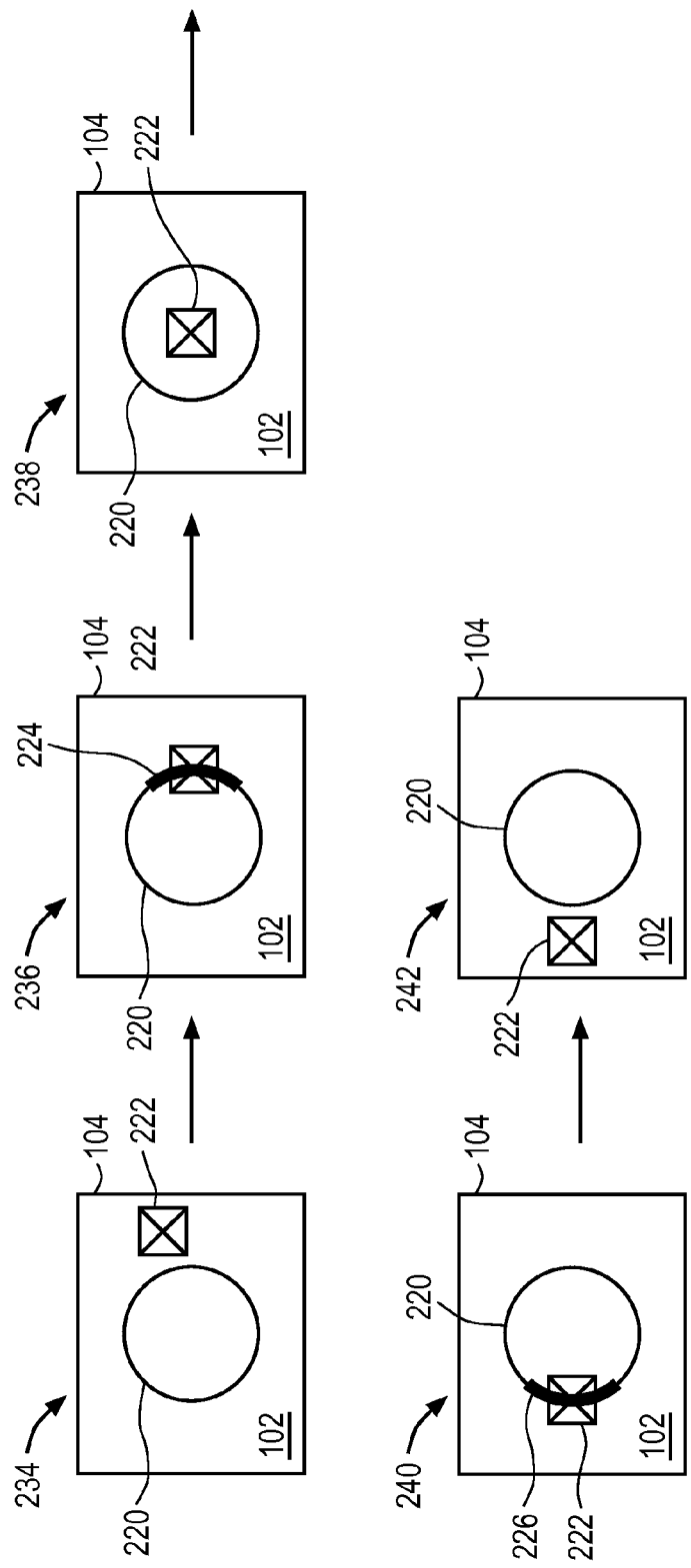
FIG. 12 is an illustrative drawing showing an example sequence of five display screen images during editing in which a display element is moved into and then out of a frame in accordance with some embodiments. In this example, the frame display has a circular shape.

FIG. 12 is an illustrative drawing showing an example sequence of five display screen images during editing in which a display element 222 is moved into and then out of a frame 220 frame in accordance with some embodiments. In this example, the frame display has a circular shape. A first screen display image 234 in the sequence of FIG. 12 represents a display screen 104 in which a region of the canvas 102 is visible that includes a frame 220 and a display element 222 outside the frame 220. A second screen display image 236 in the sequence of represents the display screen 104 showing the same region of the canvas 102 in which a user has dragged the display element 222 partially into the frame 220. In some embodiments, a portion of the frame 222 is highlighted 224 as the display element 222 is being dragged into it. A third screen display image 238 in the sequence represents a display screen 104 showing the same region of the canvas 102 in which a user has dragged the display element 222 completely inside the frame 220. A fourth screen display image 240 in the sequence represents a display screen 104 showing the same region of the canvas 102 in which a user has dragged the display element 222 partially out of the frame 220. In some embodiments, a portion of the frame 222 is highlighted 226 as the display element 222 is being dragged out of it. A fifth screen display image 242 in the sequence represents a display screen 104 in which a region of the canvas 102 is visible that includes a frame 220 and a display element 222, which is once again outside the frame 220.

Figure 13:
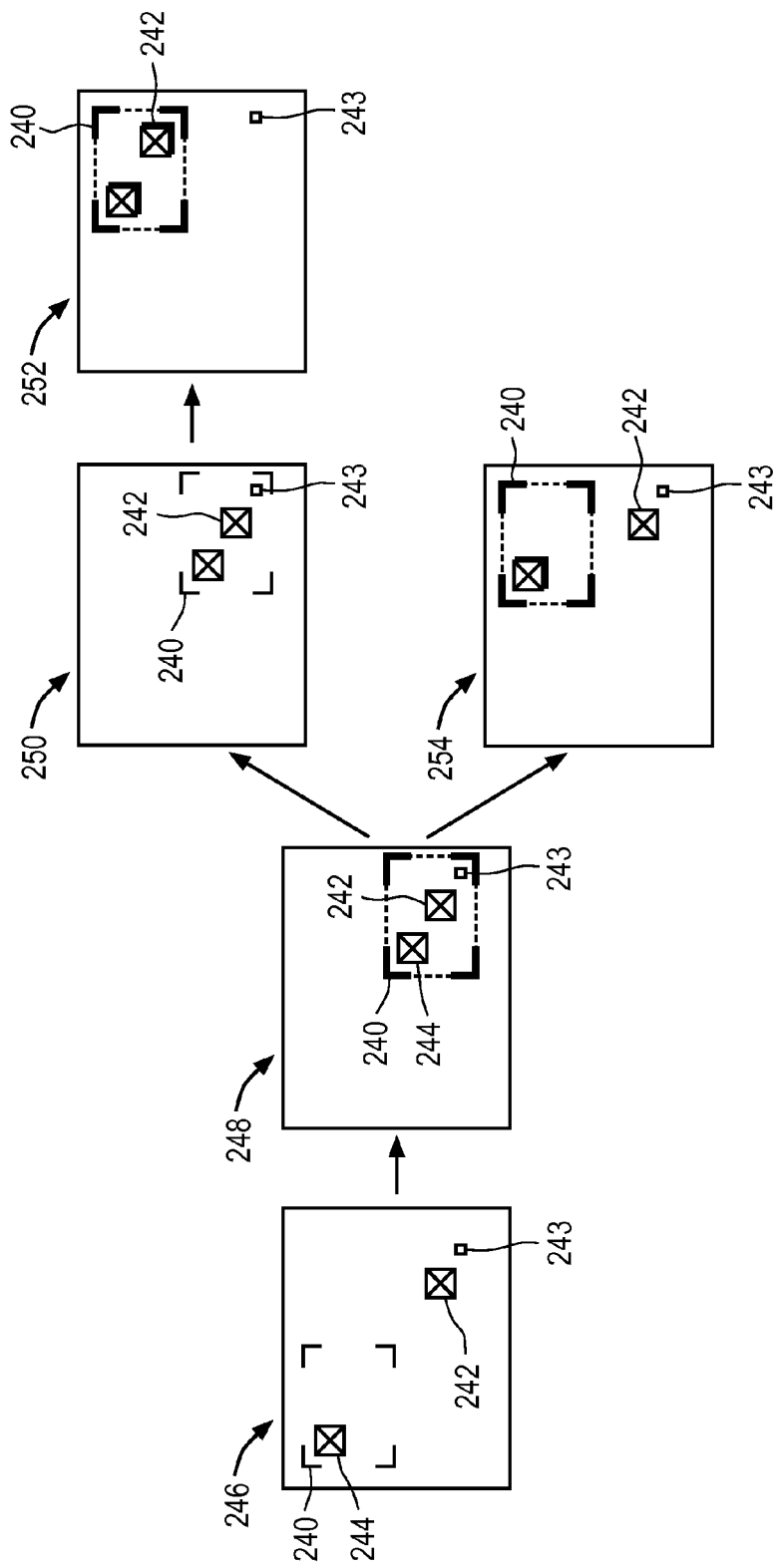
FIG. 13 is an illustrative drawing showing an example sequence of six display screen images during editing in which a frame is moved across the canvas to encompass a first display element and then is moved again accordance with some embodiments.

FIG. 13 is an illustrative drawing showing an example sequence of six display screen images during editing in which a frame 240 is moved across the canvas 102 to encompass a first display element 242 and then is moved again accordance with some embodiments. A first screen display image 246 in the sequence of FIG. 13 represents a display screen 104 in which a region of the canvas 102 is visible that includes a frame 240 that visually encompasses a second display element 244 and the first display element 242, which is outside the frame 220. Note that in the first screen image 246, the frame 240 has not been selected (indicated by the absence of dashed lines and highlights). A second screen display image 248 in the sequence of FIG. 13 represents the same region of the canvas 102 but in which the frame 240 has been selected (indicated by dashed lines and highlight) and has been moved so as to visually encompass both the first display element 242 and the second display element 244. Next, the example sequence of screen images represented by the drawings in FIG. 13 branches in one of two directions depending upon user action.

On a first branch, a third screen display image 250 in the sequence represents the same region of the canvas 102 but in which the frame 240 has been deselected but has not yet been moved from its location in the second image 248. By deselected, it is meant that a user action has occurred to indicate that the user has finished with transformation of the frame (e.g., location, size, orientation) for the time being. Next, on the first branch, a fourth screen display image 252 in the sequence shows the frame 240 containing both the first and second display elements 242 and 244 having been selected and moved. Note that the display elements 242, 244 maintain their same relative positions within the frame 240 in the third screen display image 250 and in the fourth screen display image 252.

On a second branch, a sixth screen display image 254 shows the frame 240 not yet having been deselected after having been moved to encompass the first display element 242 in the second screen display image 248. In the sixth screen display image 254, the frame 240, is shown to have been moved to a different location, the same one to which the frame 240 is moved in the fifth screen display image 252. However, the first display element 242 is left behind and does not have its location transformed together with that of the frame 240.

In some embodiments, if a frame is deselected and then reselected within a prescribed (short) time, then the behavior of the second branch prevails as if there never had been a deselection. In some embodiments, deselection of the frame element may occur implicitly through an affirmative selection by the user of a different display element (either outside or inside the frame element) or through a user's changing the ZUI to a different mode of operation (such as to presentation mode) or through a user's selection of an 'escape' function to affirmatively indicate deselection. Moreover, in some embodiments, if a frame is moved, either through transformation of its location or through expansion of its dimensions, to encompass a display element that it did not previously encompass and 'hovers' in place for some prescribed period of time without being deselected, then that newly encompassed design element will be transformed with the frame the next time the frame is transformed or when it continues its transformation.

Still referring to FIG. 13, display element 243 has a size that is smaller than some prescribed amount. Referring to the third and fourth screen images 250, 252 on the first branch, the small size display element 243 is not transformed (i.e. moved from one location to another) together with the frame and the first display element 242. The prescribed amount, for example, may be some absolute size measured in number of pixels or inches or for example, may be measured in some relative terms such as number of pixels relative to the total number of pixels visible within the display screen. In either case, in accordance with some embodiments, the user experience should be that a display element that is not readily visible to a user is not transformed with the frame that encompasses it so as to prevent a user from accidentally manipulating display elements that are not visible to the user.

Determining the Display Elements Grouped with a Frame

Figure 14:
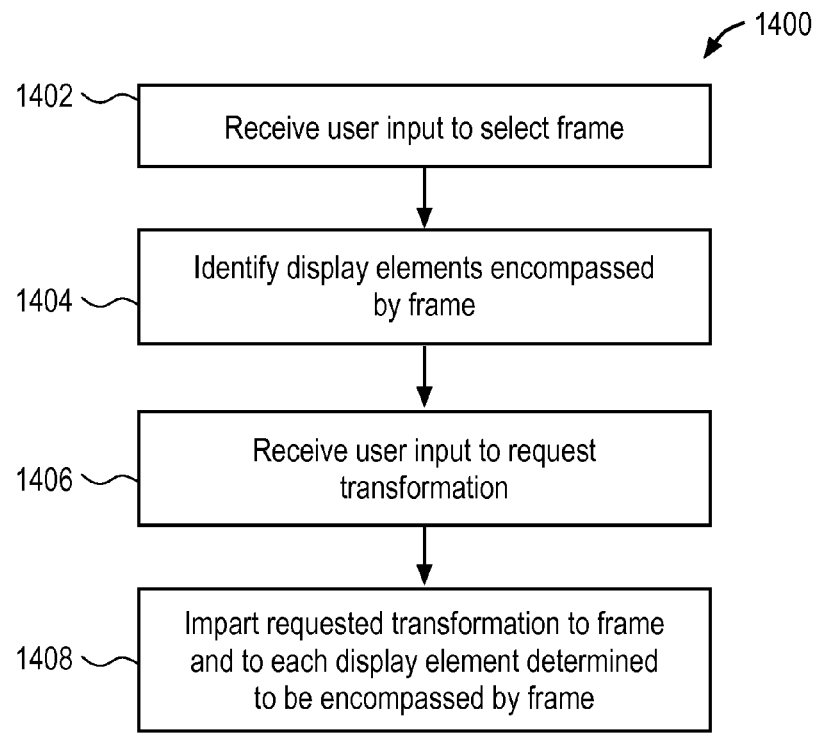
FIG. 14 is an illustrative flow diagram of a first process to transform a group of display elements encompassed by a frame in accordance with some embodiments.
Figure 15:
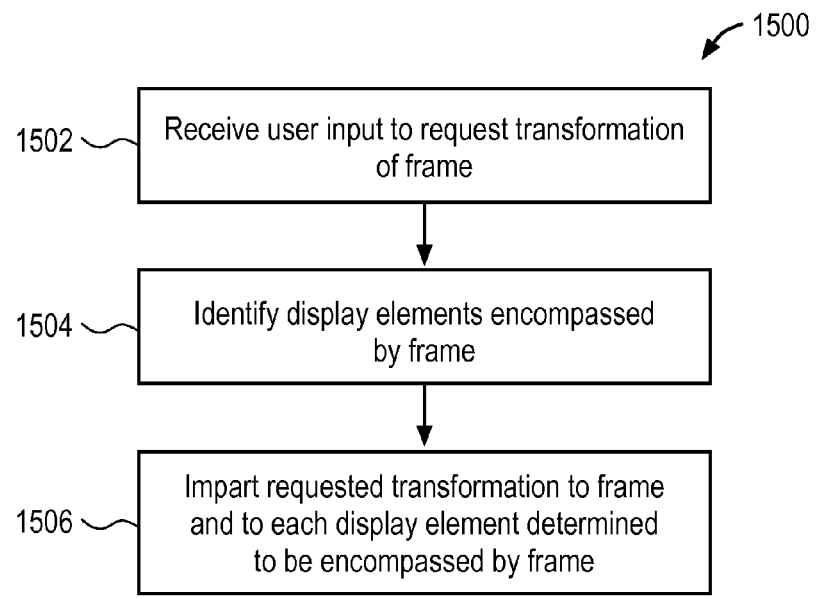
FIG. 15 is an illustrative flow diagram of a second process to transform a group of display elements encompassed by a frame in accordance with some embodiments.

FIG. 14 is an illustrative flow diagram of a first process 1400 to transform a group of display elements encompassed by a frame in accordance with some embodiments. FIG. 15 is an illustrative flow diagram of a second process 1500 to transform a group of display elements encompassed by a frame in accordance with some embodiments. Transformations include changing location of the frame on the canvas, changing the size of the frame on the canvas and changing the rotational orientation of the frame on the canvas. In addition, in some embodiments, the size of the frame can be changed by clicking and dragging without changing the size of elements within the frame. Transformations of a frame also are applied to display elements encompassed by the transformed frame. The same transformation applied to a frame is applied to each display element encompassed by the frame.

Referring FIG. 14, module 1402 detects user input that selects a frame that is displayed on a screen display. In some embodiments, user selection of a frame is indicated by a user's invoking display of the control element 101 in association with the frame, for example. In response to the detected user selection input, module 1404 identifies display elements encompassed by the frame. Module 1406 detects user input to impart a transformation to the frame. In some embodiments, user imparting a transformation of a frame is indicated by a user's actuation of a region of a control element associated with transformation of location, size or orientation, for example. In response to the detected user transformation input, module 1408 imparts the detected transformation to the frame and to each display element identified as encompassed by the selected frame.

Figure 16A:
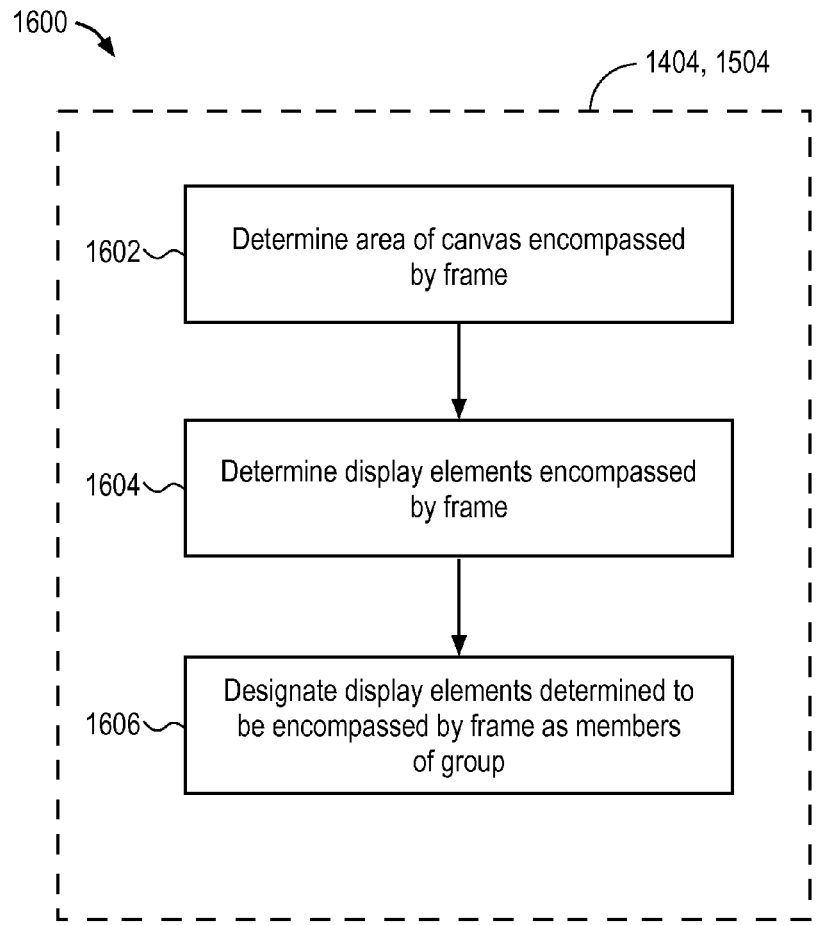
FIG. 16A is an illustrative flow diagram representing details of the processes of FIG. 14 and of FIG. 15 in accordance with some embodiments.
Figure 16B:
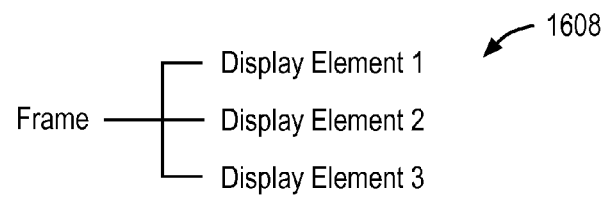
FIG. 16B is an illustrative data structure produced 'on demand' to indicate display elements encompassed by a frame that user input indicates is to be transformed in accordance with some embodiments.
Figure 17:
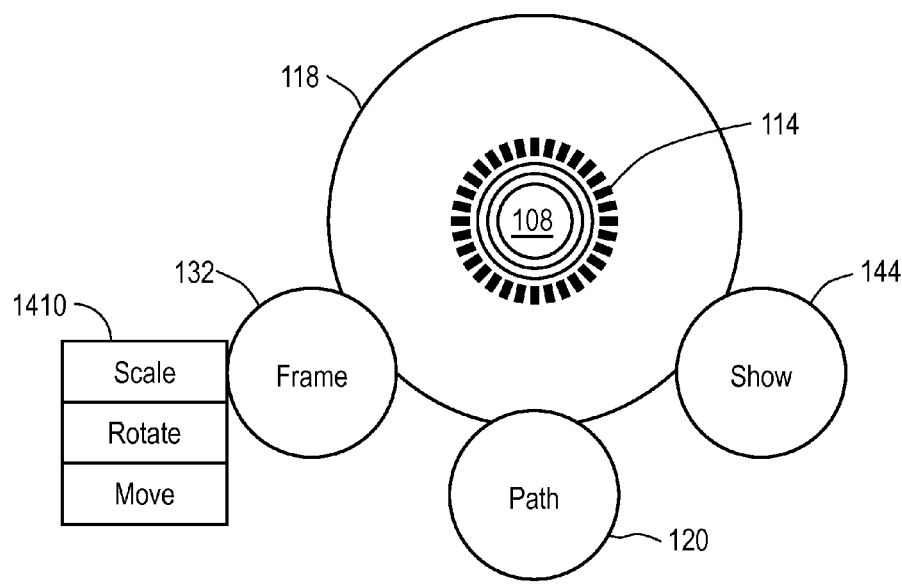
FIG. 17 is an illustrative drawing showing a control element in which a menu of transformation selections, 'scale', 'rotate' and 'move' are displayed in accordance with some embodiments.

FIG. 17 is an illustrative drawing showing a control element 101 in which a menu of transformation selections 1410, 'scale', 'rotate' and 'move' are displayed in response to detection of user selection of the frame menu 132 by module 1402 in accordance with some embodiments. Module 1402 then detects further user input to select one of the indicated transformation selections. In accordance with some embodiments, for example, in further response to user input, module 1406 detects user input (not shown) to transform the frame contents such as through manipulation of a pointing device (e.g., a mouse-like device) to achieve the selected transformation. Referring to FIG. 15, module 1502 detects user input to impart a transformation to the frame. In some embodiments, user imparting a transformation of a frame is indicated by a user's actuation of a region of a control element associated with transformation of location, size or orientation, for example. In response to the detected user transformation input, module 1504 identifies display elements encompassed by the frame. In response to the detected user transformation input, module 1506 imparts the detected transformation to the frame and to each display element identified as encompassed by the selected frame. For example, module 1502 detects a user point and select of a frame display element (not shown). Module 1506 subsequently detects a user dragging the selected frame element to move it (transform its position) within the canvas. FIG. 16A is an illustrative flow diagram representing details 1600 of modules 1404 (FIGS. 14) and 1504 (FIG. 15) of the first and second processes in accordance with some embodiments. FIG. 16B is an illustrative information structure 1608 produced 'on demand' to indicate display elements that are grouped by a frame that user input indicates is to be transformed in accordance with some embodiments. Module 1602 determines the region of the canvas occupied by a frame (not shown). Module 1604 determines display elements that occupy the region of the canvas determined to be encompassed by the frame. Module 1606 designates display elements (not shown) determined to occupy the same region as the frame to be members of a group associated with the frame. In some embodiments, a list data structure is created in computer readable storage device to identify the display elements determined to be grouped by the frame.

Figure 18:
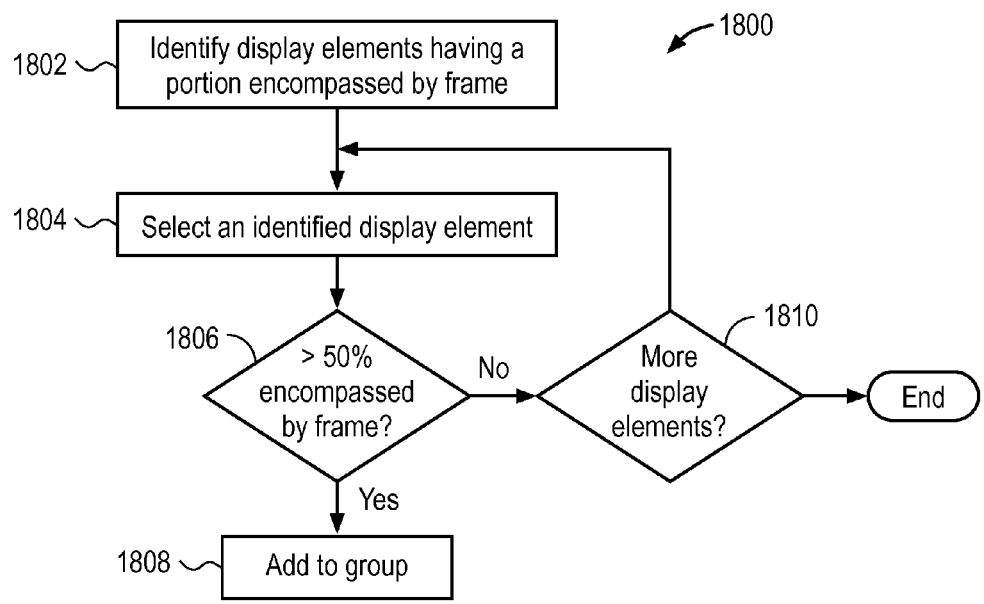
FIG. 18 is an illustrative flow diagram representing certain details of the process of FIG. 16 in accordance with some embodiments.

In some embodiments, module 1604, identifies display elements with at least two corners disposed within the frame. Next, module 1604 determines whether those identified display elements have some prescribed proportion of their total area within the frame. It will be appreciated that different rules may apply to determine whether different kinds of display elements are disposed within the frame. Module 1604 produces a data structure that identifies the display elements determined to be grouped by the frame. Thus, a determination of the set of display elements displayed within a frame and the production of a corresponding data structure e.g., a list 1608 such as that shown in FIG. 16B, occur on demand, in response to a user's indication of intent to perform a transformation of the items encompassed by the frame. FIG. 18 is an illustrative flow diagram representing details 1800 of modules 1604 and 1604 in accordance with some embodiments. Module 1802 identifies display elements that have at least a portion that is contained within the region of the canvas occupied by the frame. Module 1804 selects a display element determined to have a portion encompassed by the frame. Decision module 1806 determines whether at least a prescribed proportion of the selected display element is contained within the region of the canvas occupied by the frame. In some embodiments, the prescribe proportion is at least fifty percent of the selected display element. However, in some embodiments, different measures may be used as the prescribed proportion for different kinds of display elements. If the prescribed proportion of the display element is not contained within the frame, then control flows to module 1810, which is explained below. If the prescribed proportion of the display element is contained within the frame, then module 1808 adds the display element to the group of display elements determined to be encompassed by the frame. Control flows to module 1810, which determines whether there is another display element determined to have a portion encompassed by the frame. If yes, then control flows again to module 1802. If no, then control flows to module 1408 (FIG. 14) and module 1506 (FIG. 15) to impart the transformation to the display elements of the group.

Figure 19:
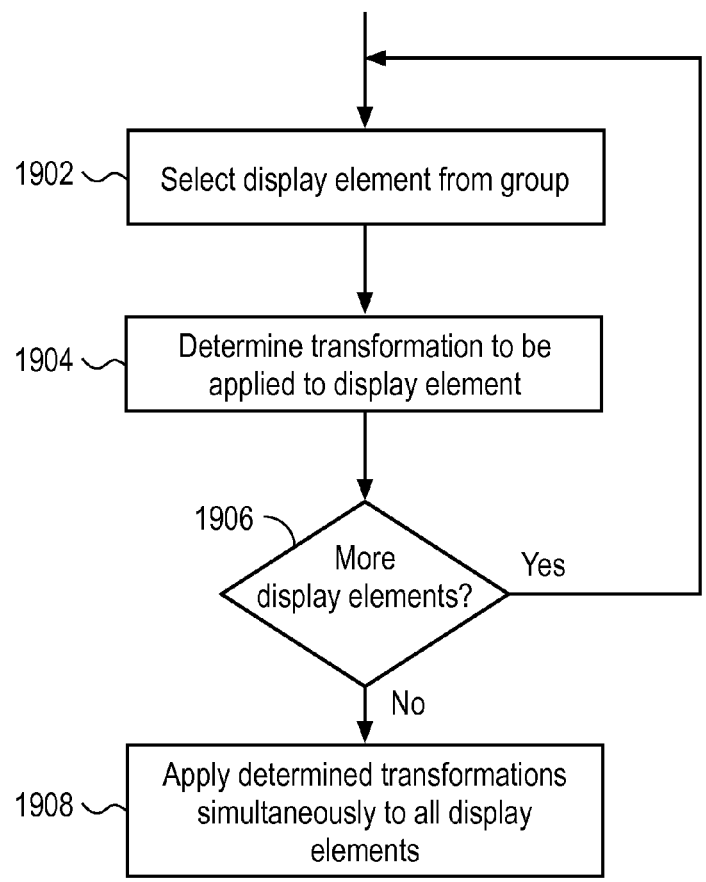
FIG. 19 is an illustrative flow diagram representing certain details of the process of FIG. 14 and the process of FIG. 15 in accordance with some embodiments.

FIG. 19 is an illustrative flow diagram representing certain details 1900 of modules 1408 (FIG. 14) and module 1506 (FIG. 15) in accordance with some embodiments. Module 1902 selects a module from the group of display elements. Module 1904 calculates a transformation of the selected display element based upon user input (e.g., location, size, orientation). Module 1906 determines whether there are additional display elements within the group that have not yet been transformed. If yes, then control flows back to module 1902. Note that the same transformation (e.g., distance, % change in size, angular change in orientation) is calculated for each display element and for the frame (which is one of the display elements also) length is applied. If no, then module 1908 applies the calculated transformations to the display elements simultaneously so that they are transformed in unison together with the transformation of the frame itself. It will be appreciated that the process 1900 may be performed recursively in order to incrementally transform the display elements so as to display a smooth transformation.

It will be appreciated that the transformations described with reference to FIG. 19 occur so quickly that they appear to a user to occur instantaneously. Alternatively, rather than transform the display elements determined to be within a frame one at a time, all display elements may be transformed simultaneously.

Determination of contents of a frame at the time the frame is transformed obviates the need to keep track of frame contents while editing other aspects of a presentation, for example. That is, there is no need to maintain or to revise data structures in a computer storage device that indicate contents of a frame unless the frame, and by implication its contents, has been selected for transformation. For instance, a display element may be moved into or out of a frame without any actual selection or transformation of the frame. Referring to FIG. 12, for example, during editing a user may drag a display element across (over) a frame from one location to another. Alternatively, for example, a user may move different combinations of display elements into and out of a frame as he or she experiments with different combinations while composing a presentation. FIGS. 5-6, for example, show the addition of display elements 192, 194 to frame 190. FIG. 11, for example shows the addition display elements 202, 204, 206 to frame 190 through transformation of the size and location of the frame 190. Also, for example, a user may transform (e.g., move, resize or rotate) display elements that are located inside a frame independently of any transformation of the frame itself. In each case, there is no need to determine or to keep track of which display elements are encompassed within a frame since the frame has not been selected for transformation. Rather, the position, size and/or orientation of a display element can be transformed independently of the frame in which it is displayed and independently of other display elements encompassed within a frame.

Moreover, once a frame is selected in some embodiments (FIG. 14) or once a transformation of a frame has commenced (FIG. 15) in other embodiments, the contents of the frame remain unchanged. Thus, for example, as shown in screen images 248 and 254 of FIG. 13, frame 240 and its constituent display element 244 may be dragged over (or under) another display element 242 on a canvas 102 without disturbing (transforming) that other display element 242. Alternately, as shown in screen images 250, 252 of FIG. 13, a display element 242 becomes a part of the group encompassed by the frame 190 when the frame is selected for transformation when it begins its move.

Hardware Embodiment

Figure 20:
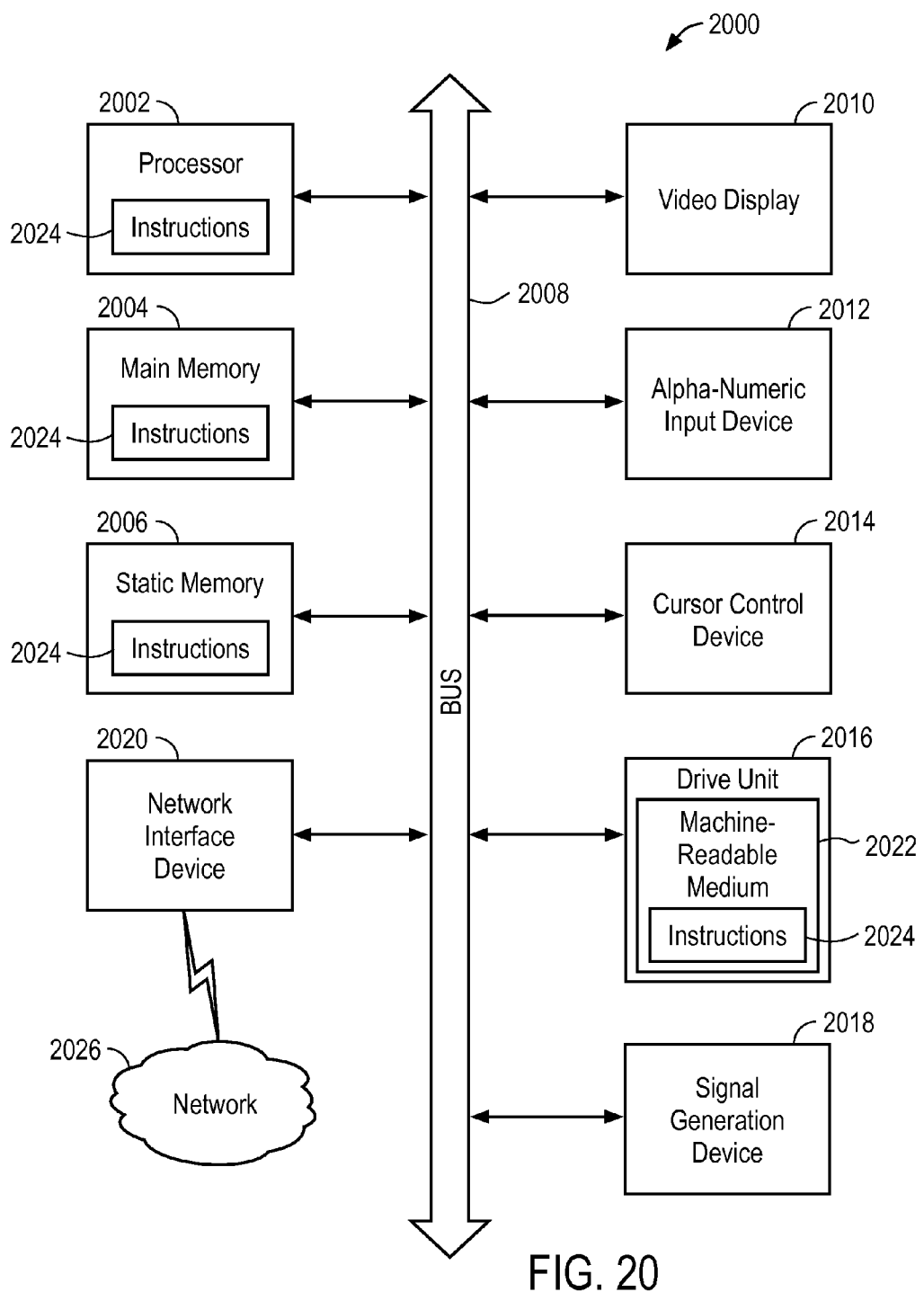
FIG. 20 is a block diagram of a computer processing system within which a set of instructions, for causing the computer to perform any one or more of the methodologies discussed herein, may be executed.

FIG. 20 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 2000 includes processor 2022 (e.g., a central processing unit (CPU), a graphics processing unit (GPU) or both), main memory 2004 and static memory 2006, which communicate with each other via bus 2008. The processing system 800 may further include video display unit 2020 (e.g., a plasma display, a liquid crystal display (LCD) or a cathode ray tube (CRT)). The processing system 2000 also includes alphanumeric input device 2022 (e.g., a keyboard), a user interface (UI) navigation device 2014 (e.g., a mouse, touch screen, or the like), a disk drive unit 2016, a signal generation device 2018 (e.g., a speaker), and a network interface device 2020.

The disk drive unit 2026 includes computer-readable storage device 2022 on which is stored one or more sets of instructions and data structures (e.g., software 2024) embodying or utilized by any one or more of the methodologies or functions described herein. The software 2024 may also reside, completely or at least partially, within a computer readable storage device such as the main memory 2004 and/or within the processor 2022 during execution thereof by the processing system 2000, the main memory 2004 and the processor 2022 also constituting computer-readable, tangible media.

The software 2024 may further be transmitted or received over network 2026 via a network interface device 2020 utilizing any one of a number of well-known transfer protocols (e.g., HTTP).

While the computer-readable storage device 2022 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A computer implemented method to edit display elements on a zooming user interface canvas displayed on a display screen to create a presentation, comprising:
   using a computer to receive user requests to add display elements to the canvas, and in response to receipt of the user input to add the display elements, adding multiple display elements to the canvas;

using the computer to receive user requests to create path segments, and in response to the user input to create path segments, creating path segments in a non-transitory storage device that indicate an order of transition among view windows that each includes the one or more of the multiple display elements on the canvas;

using the computer to receive user requests to associate zoom levels, and in response to the user input to associate zoom levels, associating zoom levels with the view windows that each includes one or more of the multiple display elements on the canvas;

displaying a frame on a portion of the canvas visible on the display screen;

using the computer to receive a user request to transform a set including multiple display elements that are displayed on the canvas encompassed by the frame;

in response to receipt of the user request to transform, using the computer to identify the set including the multiple display elements encompassed by the frame;

in response to receipt of the user request to transform the set including the multiple display elements, using the computer to produce an information structure in a non-transitory storage device that indicates each display element of the identified set of display elements that is encompassed by the frame; and using the computer to transform each display element indicated by the information structure;

wherein creating the path segments includes creating a path segment that indicates at least one of a transition to or from a view window that includes each display element of the identified set of display elements; and wherein associating zoom levels with the view windows includes associating the view window that includes each display element of the identified set of display elements with a zoom level.

2. The method of claim 1,
wherein the user request includes a request to change location on the canvas of the set of display elements; and
wherein transforming includes changing location on the canvas of each display element indicated by the information structure.

3. The method of claim 1,
wherein the user request includes a request to change size on the canvas of the set of display elements; and
wherein transforming includes changing size on the canvas of each display element indicated by the information structure.

4. The method of claim 1,
wherein the user request includes a request to change orientation on the canvas of the set of display elements; and
wherein transforming includes changing orientation on the canvas of each display element indicated by the information structure.

5. The method of claim 1,
wherein receiving a user request includes receiving user selection of the frame.

6. The method of claim 1,
wherein receiving a user request includes receiving user selection of a menu item of an editing control element displayed on the display screen.

7. The method of claim 1,
wherein the frame is associated with a framed region of a canvas;
wherein each display element of the set of display elements is associated with a location on the canvas; and
wherein the information structured indicates each display element of the set of display elements that is located within the framed region of the canvas.

8. The method of claim 1,
wherein the frame is associated with a framed region of a canvas;
wherein each display element of the set of display elements is associated with a location on the canvas; and further including:
in response to receipt of the user request, identifying the display elements encompassed by the framed region; and
wherein the information structure indicates the display elements identified as encompassed within the framed region.

9. The method of claim 8,
wherein multiple different display elements are displayed at different locations on the canvas; and
wherein identifying the display elements encompassed by the framed region includes identifying display elements of display elements that are located within the frame region.

10. The method of claim 1 further including:
prior to receiving the user request to transform the set of display elements that are displayed on the canvas encompassed by a frame, adding a display element to or deleting a display element from the set of display elements displayed on the canvas encompassed by a frame without producing information in a data structure to indicate the addition or deletion.

11. The method of claim 1 further including:
after receiving the user request to transform the set of display elements that are displayed on the canvas encompassed by a frame, adding a display element to or deleting a display element from the set of display elements displayed on the canvas encompassed by a frame without producing information in a data structure to indicate the addition or deletion.

12. The method of claim 1,
wherein the set of display elements includes a second frame; and further including:
receiving a second user request to transform a second set of display elements displayed on the canvas encompassed by the second frame that encompasses a respective one of the display elements within the set;
in response to receipt of the second user request, producing a second information structured in the non-transitory storage device that indicates each display element of a second set of display elements that is displayed on the canvas encompassed by the second frame; and
transforming each display element indicated by the second information structure.

13. The method of claim 1 further including:
receiving a user request to transform a second set of display elements are displayed on the canvas encompassed by a frame;
wherein the frame is included as a display element within the second set of display elements; and further including:
in response to receipt of the second user request, producing a second information structured in the non-transitory storage device that indicates each display element of the second set of display elements that is displayed on the canvas encompassed by the second frame; and
transforming each display element indicated by the second information structure.

14. An article of manufacture that includes non-transitory storage device encoded with instructions to a cause a computer system to implement a method edit display elements on a zooming user interface canvas displayed on a display screen to create a presentation, comprising:

in response to receipt of user input to add a display elements, adding multiple display elements to the canvas;

in response to user input to create path segments, creating path segments in a non-transitory storage device that indicate an order of transition among view windows that each includes one or more of the multiple display elements on the canvas;

in response to user input to associate zoom levels, associating zoom levels with the view windows that each includes one or more of the multiple display elements on the canvas;

displaying a frame on a portion of the canvas visible on the display screen;

receiving a user request to transform the set including the multiple display elements that are displayed on the canvas encompassed by the frame;

in response to receipt of the user request to transform, using the computer to identify the set including the multiple display elements encompassed by the frame;

in response to receipt of the user request to transform the set including the multiple display elements, producing an information structure in a non-transitory storage device that indicates each display element of the identified set of display elements that is encompassed by the frame; and transforming each display element indicated by the information structure;

wherein creating the path segments includes creating a path segment that indicates at least one of a transition to or from a view window that includes each display element of the identified set of display elements; and wherein associating zoom levels with the view windows includes associating the view window that includes each display element of the identified set of display elements with a zoom level.

15. The article of claim 14,
wherein the user request includes a request to change location on the canvas of the set of display elements; and
wherein transforming includes changing location on the canvas of each display element indicated by the information structure.

16. The article of claim 14,
wherein the user request includes a request to change size on the canvas of the set of display elements; and
wherein transforming includes changing scale of each display element indicated by the information structure.

17. The article of claim 14,
wherein the user request includes a request to change orientation on the canvas of the set of display elements; and
wherein transforming includes changing orientation on the canvas of each display element indicated by the information structure.

18. The article of claim 14,
wherein receiving a user request includes receiving user selection of the frame.

19. The article of claim 14,
wherein receiving a user request includes receiving user selection of a menu item of an editing control element displayed on the display screen.

20. The article of claim 14,
wherein the frame is associated with a framed region of a canvas;
wherein each display element of the set of display elements is associated with a location on the canvas; and
wherein the information structured indicates each display element of the set of display elements that is located within the framed region of the canvas.

21. The article of claim 14,
wherein the frame is associated with a framed region of a canvas;
wherein each display element of the set of display elements is associated with a location on the canvas; and further including:
in response to receipt of the user request, identifying the display elements encompassed by the framed region;
wherein the information structure indicates the display elements identified as encompassed within the framed region.

22. The article of claim 21,
wherein multiple different display elements are displayed at different locations on the canvas; and
wherein identifying the display elements encompassed by the framed region includes identifying display elements of display elements that are located within the frame region.

23. The article of claim 14 further including:
prior to receiving the user request to transform the set of display elements that are displayed on the canvas encompassed by a frame, adding a display element to or deleting a display element from the set of display elements displayed on the canvas encompassed by a frame without producing information in a data structure to indicate the addition or deletion.

24. The article of claim 14 further including:
after receiving the user request to transform the set of display elements that are displayed on the canvas encompassed by a frame, adding a display element to or deleting a display element from the set of display elements displayed on the canvas encompassed by a frame without producing information in a data structure to indicate the addition or deletion.

25. The method of claim 1 further including:
wherein associating zoom levels with the view windows includes associating the view window that includes each display element of the identified set of display elements with a zoom in zoom level that shows more detail of the identified display elements.

26. The method of claim 1 further including:
wherein associating zoom levels with the view windows includes associating the view window that includes each display element of the identified set of display elements with a zoom out zoom level that shows less detail of the identified display elements.

27. The method of claim 1,
wherein using the computer to receive the user request to transform the set including the multiple display elements includes:
using the computer to receive a user request to impart a transformation to the frame that is displayed on the portion of the canvas and that encompasses the set including the multiple display elements.

28. The method of claim 1 further including:
using the computer to receive user input to display the frame on the display screen.

29. The method of claim 1 further including:
using the computer to receive user input to display of the multiple display elements on the portion of the canvas; and using the computer to receive user input to display the frame on the display screen encompassing the multiple display elements displayed on the portion of the canvas.

30. The method of claim 1 further including:
using the computer to receive user input to drag one or more of the multiple display elements across the canvas to a location on the canvas encompassed within the frame.

31. The method of claim 1 further including:
using the computer to receive user input to drag the frame across the canvas to a location on the canvas where the frame encompasses the multiple display elements.

32. The method of claim 1 further including:
using the computer to receive user input to adjust size of the frame on the canvas to encompass the multiple display elements.

33. The method of claim 1 further including:
using the computer to receive user input to increase size of the frame on the canvas to encompass the multiple display elements.

34. The method of claim 1 further including:
using the computer to receive user input to drag one or more of the multiple display elements across the canvas to a portion of the canvas encompassed within the frame; and
using the computer to receive user input to adjust size of the frame on the canvas to encompass the multiple display elements.

35. The method of claim 1 further including:
using the computer to receive user input to drag the frame across the canvas to a location on the canvas where the frame encompasses the multiple display elements; and
using the computer to receive user input to adjust size of the frame on the canvas to encompass the multiple display elements.

36. The method of claim 1 further including:
displaying the identified set including the multiple display elements, as transformed, on the canvas.

37. The method of claim 1 further including:
displaying the identified set including the multiple display elements, as transformed, encompassed within the frame on the canvas.

38. The article of claim 14,
wherein using the computer to receive the user request to transform the set including the multiple display elements includes:
using the computer to receive a user request to impart a transformation to the frame displayed on the canvas on the that encompasses the set including the multiple display elements.

39. The article of claim 14 further including:
using the computer to receive user input to display the frame on the canvas.

40. The The article of claim 14 further including:
using the computer to receive user input to display of the multiple display elements on the canvas; and
using the computer to receive user input to display the frame on the canvas, encompassing the multiple display elements displayed on the display screen.

41. The article of claim 14 further including:
using the computer to receive user input to drag one or more of the multiple display elements across the canvas to a display location encompassed within the frame.

42. The article of claim 14 further including:
using the computer to receive user input to drag the frame across the canvas to a display location canvas where the frame encompasses the multiple display elements.

43. The article of claim 14 further including:
using the computer to receive user input to adjust size of the frame on the canvas to encompass the multiple display elements.

44. The article of claim 14 further including:
using the computer to receive user input to increase size of the frame on the canvas to encompass the multiple display elements.

45. The article of claim 14 further including:
using the computer to receive user input to drag one or more of the multiple display elements across the canvas to a display location encompassed within the frame; and
using the computer to receive user input to adjust size of the frame on the canvas to encompass the multiple display elements.

46. The article of claim 14 further including:
using the computer to receive user input to drag the frame across the canvas to a display location where the frame encompasses the multiple display elements; and
using the computer to receive user input to adjust size of the frame on the canvas to encompass the multiple display elements.

47. The article of claim 14 further including:
displaying the identified set including the multiple display elements, as transformed, on the canvas.

48. The article of claim 14 further including:
displaying the identified set including the multiple display elements, as transformed, encompassed within the frame on the canvas.

49. The article of claim 14 further including:
wherein associating zoom levels with the view windows includes associating the view window that includes each display element of the identified set of display elements with a zoom in zoom level that shows more detail of the identified display elements.

50. The article of claim 14 further including:
wherein associating zoom levels with the view windows includes associating the view window that includes each display element of the identified set of display elements with a zoom out zoom level that shows less detail of the identified display elements.

51. A computer implemented method to edit display elements on a zooming user interface canvas displayed on a display screen to create a presentation, comprising:
using a computer to receive user requests to add display elements to the canvas, and in response to receipt of the user input to add the display elements, adding multiple display elements to the canvas;
using the computer to receive user requests to create path segments, and in response to the user input to create path segments, creating path segments in a non-transitory storage device that indicate an order of transition among view windows that each includes the one or more of the multiple display elements on the canvas;
using the computer to receive user requests to associate zoom levels, and in response to the user input to associate zoom levels, associating zoom levels with the view windows that each includes one or more of the multiple display elements on the canvas;
displaying a frame on a portion of the canvas visible on the display screen;
using the computer to receive user input to select the frame displayed on the portion of the canvas visible on the display screen on the canvas;

in response to receipt of the user input to select the frame, using the computer to identify a set including multiple display elements displayed on the canvas encompassed by the frame;

using the computer to receive a user request to transform;

in response to receipt of the user request to transform, using the computer to produce an information structure in a non-transitory storage device that indicates each display element of the identified set of display elements that is encompassed by the frame; and using the computer to transform each display element indicated by the information structure;

wherein creating the path segments includes creating a path segment that indicates at least one of a transition to or from a view window that includes each display element of the identified set of display elements; and wherein associating zoom levels with the view windows includes associating the view window that includes each display element of the identified set of display elements with a zoom level.

52. The method of claim 51 further including:

using the computer to receive user input to display the frame on the canvas.

53. The method of claim 51 further including:

using the computer to receive user input to display of the multiple display elements on the canvas; and using the computer to receive user input to display the frame on the canvas, encompassing the multiple display elements displayed on the display screen.

54. The method of claim 51 further including:

using the computer to receive user input to drag one or more of the multiple display elements across the canvas to a display location on the canvas encompassed within the frame.

55. The method of claim 51 further including:

using the computer to receive user input to drag the frame across the canvas to a display location on the canvas where the frame encompasses the multiple display elements.

56. The method of claim 51 further including:

using the computer to receive user input to adjust size of the frame on the canvas to encompass the multiple display elements.

57. The method of claim 51 further including:

using the computer to receive user input to increase size of the frame on the canvas to encompass the multiple display elements.

58. The method of claim 51 further including:

using the computer to receive user input to drag one or more of the multiple display elements across the canvas to a display location on the canvas encompassed within the frame; and using the computer to receive user input to adjust size of the frame on the canvas to encompass the multiple display elements.

59. The method of claim 51 further including:

using the computer to receive user input to drag the frame across the canvas to a display location on the canvas where the frame encompasses the multiple display elements; and using the computer to receive user input to adjust size of the frame on the canvas to encompass the multiple display elements.

60. The method of claim 51 further including:

displaying the identified set including the multiple display elements, as transformed, on the canvas.

61. The method of claim 51 further including:

displaying the identified set including the multiple display elements, as transformed, encompassed within the frame on the canvas.

62. The method of claim 51 further including:

wherein associating zoom levels with the view windows includes associating the view window that includes each display element of the identified set of display elements with a zoom in zoom level that shows more detail of the identified display elements.

63. The method of claim 51 further including:

wherein associating zoom levels with the view windows includes associating the view window that includes each display element of the identified set of display elements with a zoom out zoom level that shows less detail of the identified display elements.

64. An article of manufacture that includes non-transitory storage device encoded with instructions to a cause a computer system to implement a method to edit display elements on a zooming user interface canvas displayed on a display screen to create a presentation, comprising:

in response to receipt of user input to add a display elements, adding multiple display elements to the canvas;

in response to user input to create path segments, creating path segments in a non-transitory storage device that indicate an order of transition among view windows that each includes one or more of the multiple display elements on the canvas;

in response to user input to associate zoom levels, associating zoom levels with the view windows that each includes one or more of the multiple display elements on the canvas;

displaying a frame on a portion of the canvas visible on the display screen;

using the computer to receive user input to select the frame;

in response to receipt of the user input to select the frame, using the computer to identify a set including multiple display elements encompassed by the frame;

using the computer to receive a user request to transform;

in response to receipt of the user request to transform, using the computer to produce an information structure in a non-transitory storage device that indicates each display element of the identified set of display elements that is encompassed by the frame; and using the computer to transform each display element indicated by the information structure;

wherein creating the path segments includes creating a path segment that indicates at least one of a transition to or from a view window that includes each display element of the identified set of display elements; and wherein associating zoom levels with the view windows includes associating the view window that includes each display element of the identified set of display elements with a zoom level.

65. The article of claim 64, wherein using the computer to receive the user request to transform the set including the multiple display elements includes:

using the computer to receive a user request to impart a transformation to the frame on the canvas that encompasses the set including the multiple display elements.

66. The article of claim 64 further including:

using the computer to receive user input to display the frame on the canvas.

67. The article of claim 64 further including:

using the computer to receive user input to display of the multiple display elements on the canvas; and using the computer to receive user input to display the frame on the canvas, encompassing the multiple display elements on the canvas displayed on the display screen.

68. The article of claim 64 further including:
using the computer to receive user input to drag one or more of the multiple display elements across the canvas to a display location encompassed within the frame.

69. The article of claim 64 further including:
using the computer to receive user input to drag the frame across the canvas to a display location where the frame encompasses the multiple display elements.

70. The article of claim 64 further including:
using the computer to receive user input to adjust size of the frame on the canvas to encompass the multiple display elements.

71. The article of claim 64 further including:
using the computer to receive user input to increase size of the frame on the canvas to encompass the multiple display elements.

72. The article of claim 64 further including:
using the computer to receive user input to drag one or more of the multiple display elements across the canvas to a display location on the canvas encompassed within the frame; and
using the computer to receive user input to adjust size of the frame on the canvas to encompass the multiple display elements.

73. The article of claim 64 further including:
using the computer to receive user input to drag the frame across the canvas to a display location where the frame encompasses the multiple display elements; and
using the computer to receive user input to adjust size of the frame on the canvas to encompass the multiple display elements.

74. The article of claim 64 further including:
displaying the identified set including the multiple display elements, as transformed, on the canvas.

75. The article of claim 64 further including:
displaying the identified set including the multiple display elements, as transformed, encompassed within the frame on the canvas.

76. The article of claim 64 further including:
wherein associating zoom levels with the view windows includes associating the view window that includes each display element of the identified set of display elements with a zoom in zoom level that shows more detail of the identified display elements.

77. The article of claim 64 further including:
wherein associating zoom levels with the view windows includes associating the view window that includes each display element of the identified set of display elements with a zoom out zoom level that shows less detail of the identified display elements.

\* \* \* \* \*